(12) United States Patent
Wilson et al.

(10) Patent No.: US 12,248,497 B2
(45) Date of Patent: Mar. 11, 2025

(54) FAMILY TREE INTERFACE

(71) Applicant: Ancestry.com Operations Inc., Lehi, UT (US)

(72) Inventors: Robert Don Wilson, Lehi, UT (US); Kenric Russell, American Fork, UT (US); Jared William Cannegieter, Provo, UT (US)

(73) Assignee: Ancestry.com Operations Inc., Lehi, UT (US)

( * ) Notice: Subject to any disclaimer, the term of this patent is extended or adjusted under 35 U.S.C. 154(b) by 10 days.

(21) Appl. No.: 18/057,904

(22) Filed: Nov. 22, 2022

(65) Prior Publication Data

US 2023/0161796 A1 May 25, 2023

Related U.S. Application Data

(60) Provisional application No. 63/282,091, filed on Nov. 22, 2021.

(51) Int. Cl.
*G06F 16/20* (2019.01)
*G06F 3/0482* (2013.01)
*G06F 16/22* (2019.01)
*G06F 16/28* (2019.01)

(52) U.S. Cl.
CPC .......... *G06F 16/287* (2019.01); *G06F 3/0482* (2013.01); *G06F 16/2246* (2019.01)

(58) Field of Classification Search
CPC ... G06F 16/287; G06F 16/2246; G06F 3/0482
See application file for complete search history.

(56) References Cited

U.S. PATENT DOCUMENTS

| | | |
|---|---|---|
| 4,201,386 A | 5/1980 | Seale et al. |
| 5,115,504 A | 5/1992 | Belove et al. |
| 5,246,374 A | 9/1993 | Boodram |

(Continued)

FOREIGN PATENT DOCUMENTS

| | | | |
|---|---|---|---|
| EP | 1550959 A2 | * | 7/2005 |
| WO | WO 2008/042232 A2 | | 4/2008 |

OTHER PUBLICATIONS

Butler, J. M., "Commonly Used Short Tandem Repeat Markers," Forensic DNA Typing, Academic Press, Chapter 5, 2001, pp. 53-54.

(Continued)

*Primary Examiner* — Daniel A Kuddus
(74) *Attorney, Agent, or Firm* — Keller Preece PLLC

(57) ABSTRACT

A family tree interface may include a default number of family members in addition to a target node which are expandable upon selection by a user. The default tree interface is expandable by a user vertically to include more generations and laterally. The tree interface includes labels showing a relationship of a tree node to the target node. In some embodiments, one or more family members that have not been rendered may be cached to speed up the visual rendering process. A graphical user interface, in a viewing session, may display an initial view of the family tree associated with the target individual. Upon receipt of an expand request, the viewing session may add the one or more additional family members to generate an expanded view of the family tree. The expanded view may partially adjust the initial view without refreshing the viewing session.

20 Claims, 20 Drawing Sheets

(56) References Cited

U.S. PATENT DOCUMENTS

| | | | |
|---|---|---|---|
| 5,413,908 A | 5/1995 | Jeffreys | |
| 5,467,471 A | 11/1995 | Bader | |
| 5,978,811 A | 11/1999 | Smiley | |
| 6,049,803 A | 4/2000 | Szalwinski | |
| 6,105,147 A | 8/2000 | Molloy | |
| 6,277,567 B1 | 8/2001 | Graziosi | |
| 6,528,260 B1 | 3/2003 | Blumenfeld et al. | |
| 6,570,567 B1 | 5/2003 | Eaton | |
| 7,957,907 B2 | 6/2011 | Sorenson et al. | |
| 8,095,567 B2* | 1/2012 | Cookson, Jr. | G06F 16/951 707/797 |
| 8,738,297 B2 | 5/2014 | Sorenson et al. | |
| 8,768,970 B2* | 7/2014 | Cookson, Jr. | G06F 16/951 707/797 |
| 8,768,971 B2* | 7/2014 | Apacible | G06F 21/6218 711/170 |
| 8,855,935 B2 | 10/2014 | Myres et al. | |
| 9,330,418 B2* | 5/2016 | Hulet | G06F 3/04847 |
| 9,959,013 B2* | 5/2018 | Hulet | G06F 3/04842 |
| 11,514,627 B2* | 11/2022 | Jewett | G06F 16/245 |
| 2003/0113727 A1 | 6/2003 | Girn et al. | |
| 2003/0172065 A1 | 9/2003 | Sorenson et al. | |
| 2003/0204418 A1 | 10/2003 | Ledley | |
| 2004/0122705 A1 | 6/2004 | Sabol et al. | |
| 2004/0229231 A1 | 11/2004 | Frudakis et al. | |
| 2004/0243531 A1 | 12/2004 | Dean | |
| 2005/0149497 A1* | 7/2005 | Cookson, Jr. | G06F 16/951 |
| 2006/0020398 A1 | 1/2006 | Vernon et al. | |
| 2006/0136143 A1 | 6/2006 | Avinash et al. | |
| 2006/0161535 A1 | 7/2006 | Holbrook | |
| 2007/0037182 A1 | 2/2007 | Gaskin et al. | |
| 2008/0154566 A1 | 6/2008 | Myres et al. | |
| 2010/0199222 A1* | 8/2010 | Kranik | G16H 10/60 707/E17.05 |
| 2011/0029564 A1* | 2/2011 | Graham | G06Q 10/10 707/E17.06 |
| 2012/0131061 A1* | 5/2012 | Cookson, Jr. | G06F 16/951 707/E17.087 |
| 2012/0218289 A1* | 8/2012 | Rasmussen | G06T 11/206 345/619 |
| 2013/0018844 A1* | 1/2013 | Graham | G06Q 10/10 707/E17.005 |
| 2014/0082568 A1* | 3/2014 | Hulet | G06F 3/04842 715/853 |
| 2016/0216857 A1* | 7/2016 | Hulet | G06F 3/0482 |
| 2020/0050648 A1* | 2/2020 | Garg | G06F 16/2246 |
| 2020/0135296 A1* | 4/2020 | Girshick | G16B 40/20 |

OTHER PUBLICATIONS

Corach, D. et al., "Mass disasters: Rapid molecular screening of human remains by means of short tandem repeats typing," Electrophoresis, vol. 16, No. 1, Sep. 1995, pp. 1617-1623.

Family Tree DNA. "Family Tree DNA." Family Tree DNA: Genealogy by Genetics, LTD., Feb. 5, 2001, 2 pages, [Online] [Retrieved Aug. 1, 2023], Retrieved from the Internet Archive <URL:https://web.archive.org/web/20010205000900/http://www.familytreedna.com/main.html>.

Merriam-Webster. "Genealogy." Merriam-Webster Online Dictionary, Apr. 23, 2009, 1 page, [Online] [Retrieved Aug. 1, 2023], Retrieved from the Internet Archive <URL:https://web.archive.org/web/20090423124015/https://www.merriam-webster.com/dictionary/genealogy>.

Oxford Ancestors. "Oxford Ancestors: We Put the Genes in Genealogy." Oxfordancestors.com, Feb. 24, 2001, 3 pages, [Online] [Retrieved Aug. 1, 2023], Retrieved from the Internet Archive <URL:https://web.archive.org/web/20010224164734/http://www.oxfordancestors.com/>.

Pugh, M. B. et al., "Stedman's Medical Dictionary." Lippincott Williams & Wilkins, 27th Edition, 2000, p. 703.

Wilson, I. J. et al., "Genealogical Inference from Microsatellite Data," Genetics, vol. 150, Sep. 1998, pp. 499-510.

* cited by examiner

FAMILY TREE INTERFACE

CROSS-REFERENCE TO RELATED APPLICATIONS

The present application claims the benefit of U.S. Provisional Patent Application No. 63/282,091, filed on Nov. 22, 2021, which is hereby incorporated by reference in its entirety.

FIELD

The disclosed embodiments relate to systems, methods, and/or computer-program products configured for family tree interfaces.

BACKGROUND

Family tree viewers or interfaces, such as those found on genealogical research services, are frequently oriented toward visualizing lateral relationships on small family trees, such as family trees having a limited number of generations represented. As family trees increase in size, however, the vertically arranged family tree view (as opposed to a horizontally arranged pedigree view) becomes difficult for a user of a genealogical research service to understand or manage. Additionally, as family trees grow in size, the complexity and latency associated with loading a family tree, with its associated nodes (representing tree persons) and edges (representing connections and relationships therebetween) into the family tree interface, correspondingly grow. Slow-loading family trees can discourage and frustrate users, preventing them in many cases from having the rewarding experiences they otherwise might have had from exploring a family tree.

Another problem that users have with existing family tree interfaces is the often-unclear relationships between tree nodes, particularly as family trees become larger, more distant from a centered person and accordingly less familiar, with complex relationships arising. As a user navigates the lines from one ancestor to another, and scrolls through the family tree, the navigation process can become cumbersome. A user can easily get "lost" in a large family tree interface as they try to navigate from one tree person to another distant tree person. Further, existing family tree interfaces do not clearly show or delineate relationships between nodes. That is, while an edge may extend between two tree persons in the family tree, it is not clear to a user how those two tree persons are related, e.g., a grandparent/grandchild relationship, great-uncle/great-niece relationship, etc.

SUMMARY

Disclosed herein relates to example embodiments that are related to a computer-implemented method for rendering a family tree in a graphical user interface. The computer-implemented method includes receiving a selection of a target individual who is associated with a family tree. The computer-implemented method may also include causing a graphical user interface, in a viewing session, to display an initial view of the family tree associated with the target individual, the initial view displaying an initial set of family members of the target individual. The computer-implemented method may further include receiving an expand request from a user to expand the initial view, the expand request associated with a particular family member in the family tree and being a request to add one or more additional family members related to the particular family member to the initial view. The computer-implemented method may further include causing the viewing session to add the one or more additional family members to generate an expanded view of the family tree, the expanded view partially adjusting the initial view without refreshing the viewing session.

In some embodiments, the expanded view is further expandable through the one or more additional family members.

In some embodiments, a number of family members in the initial set of family members is limited to a predetermined maximum limit.

In some embodiments, the initial view includes the target individual, a spouse of the target individual, a biological parent of the target individual, and a child of the target individual.

In some embodiments, the spouse is a first-married spouse of the target individual.

In some embodiments, the family tree in the viewing session includes an ego-dependent label, the ego-dependent label associated with an edge and describing a relationship category between a family member and the target individual connected by the edge.

In some embodiments, the ego-dependent label is determined based on ahnentafel numbers.

In some embodiments, the initial view of the family view includes a default number of generations related to the target individual.

In some embodiments, the expanded view expands the initial view one or more generations upward, one or more generations downward, or laterally within a generation.

In some embodiments, the family tree in the viewing session is collapsible locally.

In some embodiments, the additional one or more family members are stored in a cache associated with the graphical user interface prior to the expand request.

In some embodiments, the expand request is initiated by a selection of a control element, and the control element is arranged at a side of a node representing the particular family member, and the control element points to a direction of expansion.

In some embodiments, a non-transitory computer-readable medium that is configured to store instructions is described. The instructions, when executed by one or more processors, cause the one or more processors to perform a process that includes steps described in the above computer-implemented methods or described in any embodiments of this disclosure. In yet another embodiment, a system may include one or more processors and a storage medium that is configured to store instructions. The instructions, when executed by one or more processors, cause the one or more processors to perform a process that includes steps described in the above computer-implemented methods or described in any embodiments of this disclosure.

BRIEF DESCRIPTION OF THE DRAWINGS

Figure (FIG. 1 illustrates a diagram of a system environment of an example computing system, in accordance with some embodiments.

Figure 1:
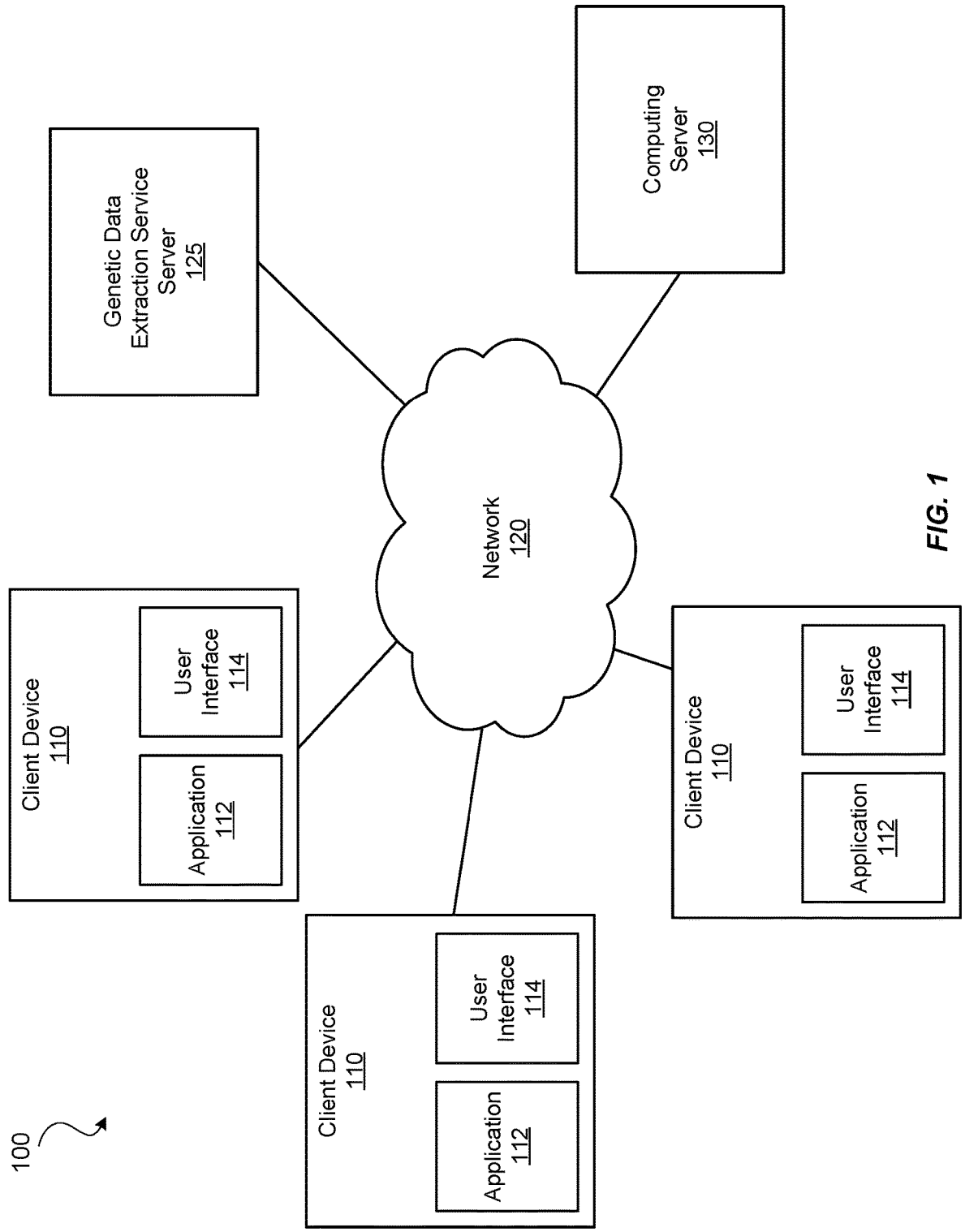

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures (FIGs.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Embodiments of family tree graphical user interface systems and methods for rendering a family tree in a graphical user interface address shortcomings in the art by providing a method, system, and/or computer-program product configured to reduce latency when rendering a family tree in a family tree graphical user interface, facilitate easier and more-intuitive navigation of a family tree, and clarify relationships between distinct and often disparate tree persons within a family tree. The improvements advantageously provide for a more-intuitive, faster, less-costly, and more-rewarding user experience while reducing the cost and complexity of providing the family tree graphical user interface and/or rendering a family tree therein.

In particular, by providing the family tree graphical user interface embodiments, the number of tree nodes (even for large family trees) that are initially loaded by default into a family tree graphical user interface are limited to a predetermined number or range of family members. In some embodiments, the initial loading may also be limited to the number of generations, such as five generations including a centered individual generation. This limits the vertical extent of the family tree within the family tree graphical user interface.

Additionally, or alternatively, the lateral extent of the family tree may be limited to a predetermined set of relationships, for example by showing initially only direct line ancestral relationships, spouses, and/or siblings. This reduces the latency of loading a large family tree. The family tree may be expandable from the default or initial family tree interface upon user selection or automatically in response to a user's navigation therewithin.

In some embodiments, user navigation of a family tree is facilitated by providing labels on edges between tree nodes. For example, a label between a parent and an ego may be labeled "Father," or "David's Father," as the case may be, or "Mother," or "David's Mother," in a case where the ego is named David, e.g., in the family tree centered on David Smith. Further, a label may be attached to or provided with the edge between the grandparents and the corresponding parents of the ego, and may be labeled "Grandfather," "Maternal Grandfather," "David's Grandfather," or "David's Maternal Grandfather," as the case may be, or "Grandmother," "Paternal Grandmother," "David's Grandmother," etc.

This allows a user to more easily see a relationship between the ego and a particular tree node, particularly where the relationship is disparate or not intuitive, such as between an ego and a great-grandparent, great-uncle, great-aunt, etc. The label may be automatically determined based on data included in the corresponding tree nodes. For example, when building a family tree using a family tree graphical user interface of the embodiments, a user may be guided through a family tree person by person, or metadata may be provided or accessed for particular tree persons. Thus, when a user fills out or edits a family tree, the family tree graphical user interface of an embodiment may prompt the user to provide relationship details for a tree node, which details can be accessed to determine the label(s). In some embodiments, ahnentafel data may be accessed and utilized to determine the label(s). In some embodiments, labels are automatically generated for different languages in which the family tree interface embodiment may be accessed, for example in English, Spanish, Swedish, French, etc.

In some embodiments, labels for endogamy or polygamy cases may be provided automatically. Thus, a toggle may allow a user to view a particular spouse (out of a plurality of spouses) if a particular ancestor of, descendant therefrom, or other relative thereto is of interest, without being obscured or confused by the other spouses. Likewise, with endogamy, where a person may appear at multiple places in a family tree due to the proximity of the spouses, labels help a user to more easily visualize the relationship between the spouse and other persons of interest.

The latency of the family tree graphical user interface embodiments of the disclosure is further improved by providing a predetermined default number of generations and relationships that are shown. Additionally, whereas in traditional family tree interfaces a large, monolithic stack, written in e.g., NET/C# is used, a smaller code base may be employed by embodiments, optionally written in node.js. This advantageously facilitates easier deployment and reduced latency.

Example System Environment

FIG. 1 illustrates a diagram of a system environment 100 of an example computing server 130, in accordance with some embodiments. The system environment 100 shown in FIG. 1 includes one or more client devices 110, a network 120, a genetic data extraction service server 125, and a computing server 130. In various embodiments, the system environment 100 may include fewer or additional components. The system environment 100 may also include different components.

The client devices 110 are one or more computing devices capable of receiving user input as well as transmitting and/or receiving data via a network 120. Example computing devices include desktop computers, laptop computers, personal digital assistants (PDAs), smartphones, tablets, wearable electronic devices (e.g., smartwatches), smart household appliances (e.g., smart televisions, smart speakers, smart home hubs), Internet of Things (IoT) devices or other suitable electronic devices. A client device 110 communicates to other components via the network 120. Users may be customers of the computing server 130 or any individuals who access the system of the computing server 130, such as an online website or a mobile application.

The application 112 may be the application where the user uses to access to the features provided by the computing server 130. The application 112 may take various suitable forms. For example, the application 112 may be a software application. The computing server 130 may publish a software application that can be downloaded and installed on a user device 110 via, for example, an application store (App store) of the user device 110. The application 112 may be a desktop software application or a mobile application. In another case, the application 112 may be a web browser that allows users to gain access to a website maintained by the computing server 130. The user interface 114 may be the web browser front end that uses markup language such as HTML to render the website of the computing server 130. In that case, the application cache 522 may be a browser cache. In various cases, the client device 110 may take the form of a graphical user interface (GUI) that displays various information and graphical elements. For example, a client device 110 executes an application that launches a GUI for a user of the client device 110 to interact with the computing server 130. The GUI may be an example of a user interface 114. A client device 110 may also execute a web browser application, which may be another example of the application 112, to enable interactions between the client device 110 and the computing server 130 via the network 120. In another embodiment, the user interface 114 may take the form of a software application published by the computing server 130 and installed on the user device 110.

The application 112 may allow the user to view various profiles of individuals stored on the computing server 130 and the individuals' associated family trees. The application 112 may render the family trees in the user interface 114. As discussed in further detail in FIG. 3 through FIG. 9, the rendering of the family tree is streamlined and the family tree is expandable and collapsible.

The network 120 provides connections to the components of the system environment 100 through one or more subnetworks, which may include any combination of local area and/or wide area networks, using both wired and/or wireless communication systems. In some embodiments, a network 120 uses standard communications technologies and/or protocols. For example, a network 120 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 120 may be represented using any suitable format, such as hypertext markup language (HTML) or extensible markup language (XML). In some embodiments, all or some of the communication links of a network 120 may be encrypted using any suitable technique or techniques such as secure sockets layer (SSL), transport layer security (TLS), virtual private networks (VPNs), Internet Protocol security (IPsec), etc. The network 120 also includes links and packet switching networks such as the Internet.

Individuals, who may be customers of a company operating the computing server 130, provide biological samples for analysis of their genetic data. Individuals may also be referred to as users. In some embodiments, an individual uses a sample collection kit to provide a biological sample (e.g., saliva, blood, hair, tissue) from which genetic data is extracted and determined according to nucleotide processing techniques such as amplification and sequencing. Amplification may include using polymerase chain reaction (PCR) to amplify segments of nucleotide samples. Sequencing may include sequencing of deoxyribonucleic acid (DNA) sequencing, ribonucleic acid (RNA) sequencing, etc. Suitable sequencing techniques may include Sanger sequencing and massively parallel sequencing such as various next-generation sequencing (NGS) techniques including whole genome sequencing, pyrosequencing, sequencing by synthesis, sequencing by ligation, and ion semiconductor sequencing. In some embodiments, a set of SNPs (e.g., 300,000) that are shared between different array platforms (e.g., Illumina OmniExpress Platform and Illumina HumanHap 650Y Platform) may be obtained as genetic data. Genetic data extraction service server 125 receives biological samples from users of the computing server 130. The genetic data extraction service server 125 performs sequencing of the biological samples and determines the base pair sequences of the individuals. The genetic data extraction service server 125 generates the genetic data of the individuals based on the sequencing results. The genetic data may include data sequenced from DNA or RNA and may include base pairs from coding and/or noncoding regions of DNA.

The genetic data may take different forms and include information regarding various biomarkers of an individual. For example, in some embodiments, the genetic data may be the base pair sequence of an individual. The base pair sequence may include the whole genome or a part of the genome such as certain genetic loci of interest. In another embodiment, the genetic data extraction service server 125 may determine genotypes from sequencing results, for example by identifying genotype values of single nucleotide polymorphisms (SNPs) present within the DNA. The results in this example may include a sequence of genotypes corresponding to various SNP sites. A SNP site may also be referred to as a SNP loci. A genetic locus is a segment of a genetic sequence. A locus can be a single site or a longer stretch. The segment can be a single base long or multiple bases long. In some embodiments, the genetic data extraction service server 125 may perform data pre-processing of the genetic data to convert raw sequences of base pairs to sequences of genotypes at target SNP sites. Since a typical human genome may differ from a reference human genome at only several million SNP sites (as opposed to billions of base pairs in the whole genome), the genetic data extraction service server 125 may extract only the genotypes at a set of target SNP sites and transmit the extracted data to the computing server 130 as the genetic dataset of an individual. SNPs, base pair sequence, genotype, haplotype, RNA sequences, protein sequences, and phenotypes are examples of biomarkers.

The computing server 130 performs various analyses of the genetic data, genealogy data, and users' survey responses to generate results regarding the phenotypes and genealogy of users of computing server 130. Depending on the embodiments, the computing server 130 may also be referred to as an online server, a personal genetic service server, a genealogy server, a family tree building server, and/or a social networking system. The computing server 130 receives genetic data from the genetic data extraction service server 125 and stores the genetic data in the data store of the computing server 130. The computing server 130 may analyze the data to generate results regarding the genetics or genealogy of users. The results regarding the genetics or genealogy of users may include the ethnicity compositions of users, paternal and maternal genetic analysis, identification or suggestion of potential family relatives, ancestor information, analyses of DNA data, potential or identified traits such as phenotypes of users (e.g., diseases, appearance traits, other genetic characteristics, and other non-genetic characteristics including social characteristics), etc. The computing server 130 may present or cause the user interface 114 to present the results to the users through a GUI displayed at the client device 110. The results may include graphical elements, textual information, data, charts, and other elements such as family trees.

In some embodiments, the computing server 130 also allows various users to create one or more genealogical profiles of the user. The genealogical profile may include a list of individuals (e.g., ancestors, relatives, friends, and other people of interest) who are added or selected by the user or suggested by the computing server 130 based on the genealogical records and/or genetic records. The user interface 114 controlled by or in communication with the computing server 130 may display the individuals in a list or as a family tree such as in the form of a pedigree chart. In some embodiments, subject to user's privacy setting and authorization, the computing server 130 may allow information generated from the user's genetic dataset to be linked to the user profile and to one or more of the family trees. The users may also authorize the computing server 130 to analyze their genetic dataset and allow their profiles to be discovered by other users.

Example Computing Server Architecture

Figure 2:
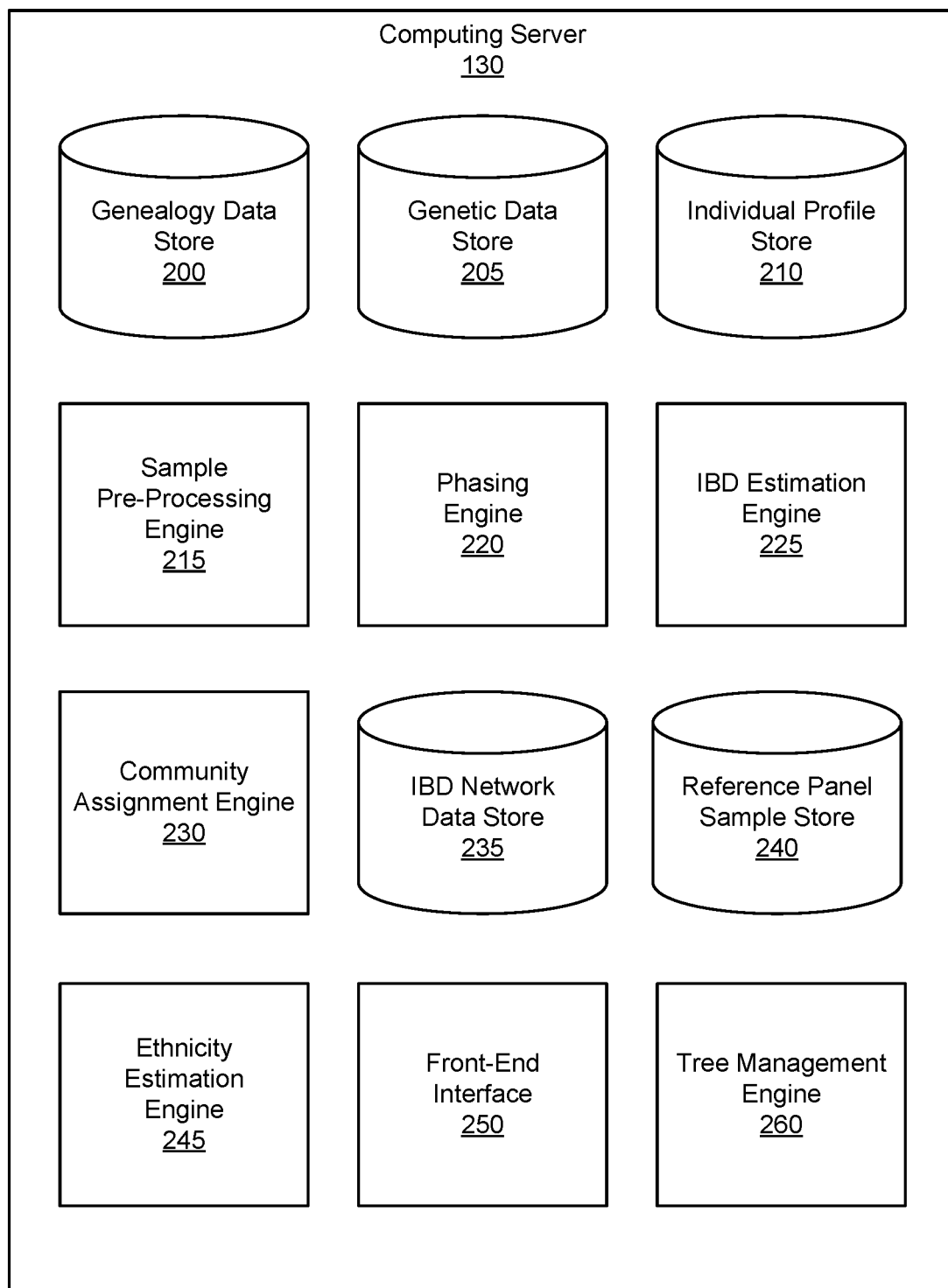
FIG. 2 is a block diagram of an architecture of an example computing system, in accordance with some embodiments.

FIG. 2 is a block diagram of an architecture of an example computing server 130, in accordance with some embodiments. In the embodiment shown in FIG. 2, the computing server 130 includes a genealogy data store 200, a genetic data store 205, an individual profile store 210, a sample pre-processing engine 215, a phasing engine 220, an identity by descent (IBD) estimation engine 225, a community assignment engine 230, an IBD network data store 235, a reference panel sample store 240, an ethnicity estimation engine 245, a front-end interface 250, and a tree management engine 260. The functions of the computing server 130 may be distributed among the elements in a different manner than described. In various embodiments, the computing server 130 may include different components and fewer or additional components. Each of the various data stores may be a single storage device, a server controlling multiple storage devices, or a distributed network that is accessible through multiple nodes (e.g., a cloud storage system).

The computing server 130 stores various data of different individuals, including genetic data, genealogy data, and survey response data. The computing server 130 processes the genetic data of users to identify shared identity-by-descent (IBD) segments between individuals. The genealogy data and survey response data may be part of user profile data. The amount and type of user profile data stored for each user may vary based on the information of a user, which is provided by the user as she creates an account and profile at a system operated by the computing server 130 and continues to build her profile, family tree, and social network at the system and to link her profile with her genetic data. Users may provide data via the user interface 114 of a client device 110. Initially and as a user continues to build her genealogical profile, the user may be prompted to answer questions related to the basic information of the user (e.g., name, date of birth, birthplace, etc.) and later on more advanced questions that may be useful for obtaining additional genealogy data. The computing server 130 may also include survey questions regarding various traits of the users such as the users' phenotypes, characteristics, preferences, habits, lifestyle, environment, etc.

Genealogy data may be stored in the genealogy data store 200 and may include various types of data that are related to tracing family relatives of users. Examples of genealogy data include names (first, last, middle, suffixes), gender, birth locations, date of birth, date of death, marriage information, spouse's information kinships, family history, dates and places for life events (e.g., birth and death), other vital data, and the like. In some instances, family history can take the form of a pedigree of an individual (e.g., the recorded relationships in the family). The family tree information associated with an individual may include one or more specified nodes. Each node in the family tree represents the individual, an ancestor of the individual who might have passed down genetic material to the individual, and the individual's other relatives including siblings, cousins, and offspring in some cases. Genealogy data may also include connections and relationships among users of the computing server 130. The information related to the connections among a user and her relatives that may be associated with a family tree may also be referred to as pedigree data or family tree data.

In addition to user-input data, genealogy data may also take other forms that are obtained from various sources such as public records and third-party data collectors. For example, genealogical records from public sources include birth records, marriage records, death records, census records, court records, probate records, adoption records, obituary records, etc. Likewise, genealogy data may include data from one or more family trees of an individual, the Ancestry World Tree system, a Social Security Death Index database, the World Family Tree system, a birth certificate database, a death certificate database, a marriage certificate database, an adoption database, a draft registration database, a veterans database, a military database, a property records database, a census database, a voter registration database, a phone database, an address database, a newspaper database, an immigration database, a family history records database, a local history records database, a business registration database, a motor vehicle database, and the like.

Furthermore, the genealogy data store 200 may also include relationship information inferred from the genetic data stored in the genetic data store 205 and information received from the individuals. For example, the relationship information may indicate which individuals are genetically related, how they are related, how many generations back they share common ancestors, lengths and locations of IBD segments shared, which genetic communities an individual is a part of, variants carried by the individual, and the like.

The computing server 130 maintains genetic datasets of individuals in the genetic data store 205. A genetic dataset of an individual may be a digital dataset of nucleotide data (e.g., SNP data) and corresponding metadata. A genetic dataset may contain data on the whole or portions of an individual's genome. The genetic data store 205 may store a pointer to a location associated with the genealogy data store 200 associated with the individual. A genetic dataset may take different forms. In some embodiments, a genetic dataset may take the form of a base pair sequence of the sequencing result of an individual. A base pair sequence dataset may include the whole genome of the individual (e.g., obtained from a whole-genome sequencing) or some parts of the genome (e.g., genetic loci of interest).

In another embodiment, a genetic dataset may take the form of sequences of genetic markers. Examples of genetic markers may include target SNP loci (e.g., allele sites) filtered from the sequencing results. A SNP locus that is single base pair long may also be referred to a SNP site. A SNP locus may be associated with a unique identifier. The genetic dataset may be in a form of diploid data that includes a sequencing of genotypes, such as genotypes at the target SNP loci, or the whole base pair sequence that includes genotypes at known SNP loci and other base pair sites that are not commonly associated with known SNPs. The diploid dataset may be referred to as a genotype dataset or a genotype sequence. Genotype may have a different meaning in various contexts. In one context, an individual's genotype may refer to a collection of diploid alleles of an individual. In other contexts, a genotype may be a pair of alleles present on two chromosomes for an individual at a given genetic marker such as a SNP site.

Genotype data for a SNP site may include a pair of alleles. The pair of alleles may be homozygous (e.g., A-A or G-G) or heterozygous (e.g., A-T, C-T). Instead of storing the actual nucleotides, the genetic data store 205 may store genetic data that are converted to bits. For a given SNP site, oftentimes only two nucleotide alleles (instead of all 4) are observed. As such, a 2-bit number may represent a SNP site. For example, 00 may represent homozygous first alleles, 11 may represent homozygous second alleles, and 01 or 10 may represent heterozygous alleles. A separate library may store what nucleotide corresponds to the first allele and what nucleotide corresponds to the second allele at a given SNP site.

A diploid dataset may also be phased into two sets of haploid data, one corresponding to a first parent side and another corresponding to a second parent side. The phased datasets may be referred to as haplotype datasets or haplotype sequences. Similar to genotype, haplotype may have a different meaning in various contexts. In one context, a haplotype may also refer to a collection of alleles that corresponds to a genetic segment. In other contexts, a haplotype may refer to a specific allele at a SNP site. For example, a sequence of haplotypes may refer to a sequence of alleles of an individual that are inherited from a parent.

The individual profile store 210 stores profiles and related metadata associated with various individuals appeared in the computing server 130. A computing server 130 may use unique individual identifiers to identify various users and other non-users that might appear in other data sources such as ancestors or historical persons who appear in any family tree or genealogy database. A unique individual identifier may be a hash of certain identification information of an individual, such as a user's account name, user's name, date of birth, location of birth, or any suitable combination of the information. The profile data related to an individual may be stored as metadata associated with an individual's profile. For example, the unique individual identifier and the metadata may be stored as a key-value pair using the unique individual identifier as a key.

An individual's profile data may include various kinds of information related to the individual. The metadata about the individual may include one or more pointers associating genetic datasets such as genotype and phased haplotype data of the individual that are saved in the genetic data store 205. The metadata about the individual may also be individual information related to family trees and pedigree datasets that include the individual. The profile data may further include declarative information about the user that was authorized by the user to be shared and may also include information inferred by the computing server 130. Other examples of information stored in a user profile may include biographic, demographic, and other types of descriptive information such as work experience, educational history, gender, hobbies, or preferences, location and the like. In some embodiments, the user profile data may also include one or more photos of the users and photos of relatives (e.g., ancestors) of the users that are uploaded by the users. A user may authorize the computing server 130 to analyze one or more photos to extract information, such as the user's or relative's appearance traits (e.g., blue eyes, curved hair, etc.), from the photos. The appearance traits and other information extracted from the photos may also be saved in the profile store. In some cases, the computing server may allow users to upload many different photos of the users, their relatives, and even friends. User profile data may also be obtained from other suitable sources, including historical records (e.g., records related to an ancestor), medical records, military records, photographs, other records indicating one or more traits, and other suitable recorded data.

For example, the computing server 130 may present various survey questions to its users from time to time. The responses to the survey questions may be stored at individual profile store 210. The survey questions may be related to various aspects of the users and the users' families. Some survey questions may be related to users' phenotypes, while other questions may be related to environmental factors of the users.

Survey questions may concern health or disease-related phenotypes, such as questions related to the presence or absence of genetic diseases or disorders, inheritable diseases or disorders, or other common diseases or disorders that have a family history as one of the risk factors, questions regarding any diagnosis of increased risk of any diseases or disorders, and questions concerning wellness-related issues such as a family history of obesity, family history of causes of death, etc. The diseases identified by the survey questions may be related to single-gene diseases or disorders that are caused by a single-nucleotide variant, an insertion, or a deletion. The diseases identified by the survey questions may also be multifactorial inheritance disorders that may be caused by a combination of environmental factors and genes. Examples of multifactorial inheritance disorders may include heart disease, Alzheimer's disease, diabetes, cancer, and obesity. The computing server 130 may obtain data on a user's disease-related phenotypes from survey questions about the health history of the user and her family and also from health records uploaded by the user.

Survey questions also may be related to other types of phenotypes such as appearance traits of the users. A survey regarding appearance traits and characteristics may include questions related to eye color, iris pattern, freckles, chin types, finger length, dimple chin, earlobe types, hair color, hair curl, skin pigmentation, susceptibility to skin burn, bitter taste, male baldness, baldness pattern, presence of unibrow, presence of wisdom teeth, height, and weight. A survey regarding other traits also may include questions related to users' taste and smell such as the ability to taste bitterness, asparagus smell, cilantro aversion, etc. A survey regarding traits may further include questions related to users' body conditions such as lactose tolerance, caffeine consumption, malaria resistance, norovirus resistance, muscle performance, alcohol flush, etc. Other survey questions regarding a person's physiological or psychological traits may include vitamin traits and sensory traits such as the ability to sense an asparagus metabolite. Traits may also be collected from historical records, electronic health records and electronic medical records.

The computing server 130 also may present various survey questions related to the environmental factors of users. In this context, an environmental factor may be a factor that is not directly connected to the genetics of the users. Environmental factors may include users' preferences, habits, and lifestyles. For example, a survey regarding users' preferences may include questions related to things and activities that users like or dislike, such as types of music a user enjoys, dancing preference, party-going preference, certain sports that a user plays, video game preferences, etc. Other questions may be related to the users' diet preferences such as like or dislike a certain type of food (e.g., ice cream, egg). A survey related to habits and lifestyle may include questions regarding smoking habits, alcohol consumption and frequency, daily exercise duration, sleeping habits (e.g., morning person versus night person), sleeping cycles and problems, hobbies, and travel preferences. Additional environmental factors may include diet amount (calories, macronutrients), physical fitness abilities (e.g. stretching, flexibility, heart rate recovery), family type (adopted family or not, has siblings or not, lived with extended family during childhood), property and item ownership (has home or rents, has a smartphone or doesn't, has a car or doesn't).

Surveys also may be related to other environmental factors such as geographical, social-economic, or cultural factors. Geographical questions may include questions related to the birth location, family migration history, town, or city of users' current or past residence. Social-economic questions may be related to users' education level, income, occupations, self-identified demographic groups, etc. Questions related to culture may concern users' native language, language spoken at home, customs, dietary practices, etc. Other questions related to users' cultural and behavioral questions are also possible.

For any survey questions asked, the computing server 130 may also ask an individual the same or similar questions regarding the traits and environmental factors of the ancestors, family members, other relatives or friends of the individual. For example, a user may be asked about the native language of the user and the native languages of the user's parents and grandparents. A user may also be asked about the health history of his or her family members.

In addition to storing the survey data in the individual profile store 210, the computing server 130 may store some responses that correspond to data related to genealogical and genetics respectively to genealogy data store 200 and genetic data store 205.

The user profile data, photos of users, survey response data, the genetic data, and the genealogy data may be subject to the privacy and authorization setting of the users to specify any data related to the users that can be accessed, stored, obtained, or otherwise used. For example, when presented with a survey question, a user may select to answer or skip the question. The computing server 130 may present users from time to time information regarding users' selection of the extent of information and data shared. The computing server 130 also may maintain and enforce one or more privacy settings for users in connection with the access of the user profile data, photos, genetic data, and other sensitive data. For example, the user may pre-authorize the access to the data and may change the setting as wished. The privacy settings also may allow a user to specify (e.g., by opting out, by not opting in) whether the computing server 130 may receive, collect, log, or store particular data associated with the user for any purpose. A user may restrict her data at various levels. For example, on one level, the data may not be accessed by the computing server 130 for purposes other than displaying the data in the user's own profile. On another level, the user may authorize anonymization of her data and participate in studies and researches conducted by the computing server 130 such as a large-scale genetic study. On yet another level, the user may turn some portions of her genealogy data public to allow the user to be discovered by other users (e.g., potential relatives) and be connected to one or more family trees. Access or sharing of any information or data in the computing server 130 may also be subject to one or more similar privacy policies. A user's data and content objects in the computing server 130 may also be associated with different levels of restriction. The computing server 130 may also provide various notification features to inform and remind users of their privacy and access settings. For example, when privacy settings for a data entry allow a particular user or other entities to access the data, the data may be described as being "visible," "public," or other suitable labels, contrary to a "private" label.

In some cases, the computing server 130 may have a heightened privacy protection on certain types of data and data related to certain vulnerable groups. In some cases, the heightened privacy settings may strictly prohibit the use, analysis, and sharing of data related to a certain vulnerable group. In other cases, the heightened privacy settings may specify that data subject to those settings require prior approval for access, publication, or other use. In some cases, the computing server 130 may provide the heightened privacy as a default setting for certain types of data, such as genetic data or any data that the user marks as sensitive. The user may opt in to sharing of those data or change the default privacy settings. In other cases, the heightened privacy settings may apply across the board for all data of certain groups of users. For example, if computing server 130 determines that the user is a minor or has recognized that a picture of a minor is uploaded, the computing server 130 may designate all profile data associated with the minor as sensitive. In those cases, the computing server 130 may have one or more extra steps in seeking and confirming any sharing or use of the sensitive data.

The sample pre-processing engine 215 receives and pre-processes data received from various sources to change the data into a format used by the computing server 130. For genealogy data, the sample pre-processing engine 215 may receive data from an individual via the user interface 114 of the client device 110. To collect the user data (e.g., genealogical and survey data), the computing server 130 may cause an interactive user interface on the client device 110 to display interface elements in which users can provide genealogy data and survey data. Additional data may be obtained from scans of public records. The data may be manually provided or automatically extracted via, for example, optical character recognition (OCR) performed on census records, town or government records, or any other item of printed or online material. Some records may be obtained by digitalizing written records such as older census records, birth certificates, death certificates, etc.

The sample pre-processing engine 215 may also receive raw data from genetic data extraction service server 125. The genetic data extraction service server 125 may perform laboratory analysis of biological samples of users and generate sequencing results in the form of digital data. The sample pre-processing engine 215 may receive the raw genetic datasets from the genetic data extraction service server 125. Most of the mutations that are passed down to descendants are related to single-nucleotide polymorphism (SNP). SNP is a substitution of a single nucleotide that occurs at a specific position in the genome. The sample pre-processing engine 215 may convert the raw base pair sequence into a sequence of genotypes of target SNP sites. Alternatively, the pre-processing of this conversion may be performed by the genetic data extraction service server 125. The sample pre-processing engine 215 identifies autosomal SNPs in an individual's genetic dataset. In some embodiments, the SNPs may be autosomal SNPs. In some embodiments, 700,000 SNPs may be identified in an individual's data and may be stored in genetic data store 205. Alternatively, in some embodiments, a genetic dataset may include at least 10,000 SNP sites. In another embodiment, a genetic dataset may include at least 100,000 SNP sites. In yet another embodiment, a genetic dataset may include at least 300,000 SNP sites. In yet another embodiment, a genetic dataset may include at least 1,000,000 SNP sites. The sample pre-processing engine 215 may also convert the nucleotides into bits. The identified SNPs, in bits or in other suitable formats, may be provided to the phasing engine 220 which phases the individual's diploid genotypes to generate a pair of haplotypes for each user.

The phasing engine 220 phases diploid genetic dataset into a pair of haploid genetic datasets and may perform imputation of SNP values at certain sites whose alleles are missing. An individual's haplotype may refer to a collection of alleles (e.g., a sequence of alleles) that are inherited from a parent.

Phasing may include a process of determining the assignment of alleles (particularly heterozygous alleles) to chromosomes. Owing to sequencing conditions and other constraints, a sequencing result often includes data regarding a pair of alleles at a given SNP locus of a pair of chromosomes but may not be able to distinguish which allele belongs to which specific chromosome. The phasing engine 220 uses a genotype phasing algorithm to assign one allele to a first chromosome and another allele to another chromosome. The genotype phasing algorithm may be developed based on an assumption of linkage disequilibrium (LD), which states that haplotype in the form of a sequence of alleles tends to cluster together. The phasing engine 220 is configured to generate phased sequences that are also commonly observed in many other samples. Put differently, haplotype sequences of different individuals tend to cluster together. A haplotype-cluster model may be generated to determine the probability distribution of a haplotype that includes a sequence of alleles. The haplotype-cluster model may be trained based on labeled data that includes known phased haplotypes from a trio (parents and a child). A trio is used as a training sample because the correct phasing of the child is almost certain by comparing the child's genotypes to the parent's genetic datasets. The haplotype-cluster model may be generated iteratively along with the phasing process with a large number of unphased genotype datasets. The haplotype-cluster model may also be used to impute one or more missing data.

By way of example, the phasing engine 220 may use a directed acyclic graph model such as a hidden Markov model (HMM) to perform the phasing of a target genotype dataset. The directed acyclic graph may include multiple levels, each level having multiple nodes representing different possibilities of haplotype clusters. An emission probability of a node, which may represent the probability of having a particular haplotype cluster given an observation of the genotypes may be determined based on the probability distribution of the haplotype-cluster model. A transition probability from one node to another may be initially assigned to a non-zero value and be adjusted as the directed acyclic graph model and the haplotype-cluster model are trained. Various paths are possible in traversing different levels of the directed acyclic graph model. The phasing engine 220 determines a statistically likely path, such as the most probable path or a probable path that is at least more likely than 95% of other possible paths, based on the transition probabilities and the emission probabilities. A suitable dynamic programming algorithm such as the Viterbi algorithm may be used to determine the path. The determined path may represent the phasing result. U.S. Pat. No. 10,679,729, entitled "Haplotype Phasing Models," granted on Jun. 9, 2020, describes example embodiments of haplotype phasing. Other example phasing embodiments are described in U.S. Patent Application Publication No. US 2021/0034647, entitled "Clustering of Matched Segments to Determine Linkage of Dataset in a Database," published on Feb. 4, 2021.

The IBD estimation engine 225 estimates the amount of shared genetic segments between a pair of individuals based on phased genotype data (e.g., haplotype datasets) that are stored in the genetic data store 205. IBD segments may be segments identified in a pair of individuals that are putatively determined to be inherited from a common ancestor. The IBD estimation engine 225 retrieves a pair of haplotype datasets for each individual. The IBD estimation engine 225 may divide each haplotype dataset sequence into a plurality of windows. Each window may include a fixed number of SNP sites (e.g., about 100 SNP sites). The IBD estimation engine 225 identifies one or more seed windows in which the alleles at all SNP sites in at least one of the phased haplotypes between two individuals are identical. The IBD estimation engine 225 may expand the match from the seed windows to nearby windows until the matched windows reach the end of a chromosome or until a homozygous mismatch is found, which indicates the mismatch is not attributable to potential errors in phasing or imputation. The IBD estimation engine 225 determines the total length of matched segments, which may also be referred to as IBD segments. The length may be measured in the genetic distance in the unit of centimorgans (cM). A unit of centimorgan may be a genetic length. For example, two genomic positions that are one cM apart may have a 1% chance during each meiosis of experiencing a recombination event between the two positions. The computing server 130 may save data regarding individual pairs who share a length of IBD segments exceeding a predetermined threshold (e.g., 6 cM), in a suitable data store such as in the genealogy data store 200. U.S. Pat. No. 10,114,922, entitled "Identifying Ancestral Relationships Using a Continuous stream of Input," granted on Oct. 30, 2018, and U.S. Pat. No. 10,720, 229, entitled "Reducing Error in Predicted Genetic Relationships," granted on Jul. 21, 2020, describe example embodiments of IBD estimation.

Typically, individuals who are closely related share a relatively large number of IBD segments, and the IBD segments tend to have longer lengths (individually or in aggregate across one or more chromosomes). In contrast, individuals who are more distantly related share relatively fewer IBD segments, and these segments tend to be shorter (individually or in aggregate across one or more chromosomes). For example, while close family members often share upwards of 71 cM of IBD (e.g., third cousins), more distantly related individuals may share less than 12 cM of IBD. The extent of relatedness in terms of IBD segments between two individuals may be referred to as IBD affinity. For example, the IBD affinity may be measured in terms of the length of IBD segments shared between two individuals.

Community assignment engine 230 assigns individuals to one or more genetic communities based on the genetic data of the individuals. A genetic community may correspond to an ethnic origin or a group of people descended from a common ancestor. The granularity of genetic community classification may vary depending on embodiments and methods used to assign communities. For example, in some embodiments, the communities may be African, Asian, European, etc. In another embodiment, the European community may be divided into Irish, German, Swedes, etc. In yet another embodiment, the Irish may be further divided into Irish in Ireland, Irish immigrated to America in 1800, Irish immigrated to America in 1900, etc. The community classification may also depend on whether a population is admixed or unadmixed. For an admixed population, the classification may further be divided based on different ethnic origins in a geographical region.

Community assignment engine 230 may assign individuals to one or more genetic communities based on their genetic datasets using machine learning models trained by unsupervised learning or supervised learning. In an unsupervised approach, the community assignment engine 230 may generate data representing a partially connected undirected graph. In this approach, the community assignment engine 230 represents individuals as nodes. Some nodes are connected by edges whose weights are based on IBD affinity between two individuals represented by the nodes. For example, if the total length of two individuals' shared IBD segments does not exceed a predetermined threshold, the nodes are not connected. The edges connecting two nodes are associated with weights that are measured based on the IBD affinities. The undirected graph may be referred to as an IBD network. The community assignment engine 230 uses clustering techniques such as modularity measurement (e.g., the Louvain method) to classify nodes into different clusters in the IBD network. Each cluster may represent a community. The community assignment engine 230 may also determine sub-clusters, which represent sub-communities. The computing server 130 saves the data representing the IBD network and clusters in the IBD network data store 235. U.S. Pat. No. 10,223,498, entitled "Discovering Population Structure from Patterns of Identity-By-Descent," granted on Mar. 5, 2019, describes example embodiments of community detection and assignment.

The community assignment engine 230 may also assign communities using supervised techniques. For example, genetic datasets of known genetic communities (e.g., individuals with confirmed ethnic origins) may be used as training sets that have labels of the genetic communities. Supervised machine learning classifiers, such as logistic regressions, support vector machines, random forest classifiers, and neural networks may be trained using the training set with labels. A trained classifier may distinguish binary or multiple classes. For example, a binary classifier may be trained for each community of interest to determine whether a target individual's genetic dataset belongs or does not belong to the community of interest. A multi-class classifier such as a neural network may also be trained to determine whether the target individual's genetic dataset most likely belongs to one of several possible genetic communities.

Reference panel sample store 240 stores reference panel samples for different genetic communities. A reference panel sample is a genetic data of an individual whose genetic data is the most representative of a genetic community. The genetic data of individuals with the typical alleles of a genetic community may serve as reference panel samples. For example, some alleles of genes may be over-represented (e.g., being highly common) in a genetic community. Some genetic datasets include alleles that are commonly present among members of the community. Reference panel samples may be used to train various machine learning models in classifying whether a target genetic dataset belongs to a community, determining the ethnic composition of an individual, and determining the accuracy of any genetic data analysis, such as by computing a posterior probability of a classification result from a classifier.

A reference panel sample may be identified in different ways. In some embodiments, an unsupervised approach in community detection may apply the clustering algorithm recursively for each identified cluster until the sub-clusters contain a number of nodes that are smaller than a threshold (e.g., contains fewer than 1000 nodes). For example, the community assignment engine 230 may construct a full IBD network that includes a set of individuals represented by nodes and generate communities using clustering techniques. The community assignment engine 230 may randomly sample a subset of nodes to generate a sampled IBD network. The community assignment engine 230 may recursively apply clustering techniques to generate communities in the sampled IBD network. The sampling and clustering may be repeated for different randomly generated sampled IBD networks for various runs. Nodes that are consistently assigned to the same genetic community when sampled in various runs may be classified as a reference panel sample. The community assignment engine 230 may measure the consistency in terms of a predetermined threshold. For example, if a node is classified to the same community 95% (or another suitable threshold) of the times whenever the node is sampled, the genetic dataset corresponding to the individual represented by the node may be regarded as a reference panel sample. Additionally, or alternatively, the community assignment engine 230 may select N most consistently assigned nodes as a reference panel for the community.

Other ways to generate reference panel samples are also possible. For example, the computing server 130 may collect a set of samples and gradually filter and refine the samples until high-quality reference panel samples are selected. For example, a candidate reference panel sample may be selected from an individual whose recent ancestors are born at a certain birthplace. The computing server 130 may also draw sequence data from the Human Genome Diversity Project (HGDP). Various candidates may be manually screened based on their family trees, relatives' birth location, and other quality control. Principal component analysis may be used to create clusters of genetic data of the candidates. Each cluster may represent an ethnicity. The predictions of the ethnicity of those candidates may be compared to the ethnicity information provided by the candidates to perform further screening.

The ethnicity estimation engine 245 estimates the ethnicity composition of a genetic dataset of a target individual. The genetic datasets used by the ethnicity estimation engine 245 may be genotype datasets or haplotype datasets. For example, the ethnicity estimation engine 245 estimates the ancestral origins (e.g., ethnicity) based on the individual's genotypes or haplotypes at the SNP sites. To take a simple example of three ancestral populations corresponding to African, European and Native American, an admixed user may have nonzero estimated ethnicity proportions for all three ancestral populations, with an estimate such as [0.05, 0.65, 0.30], indicating that the user's genome is 5% attributable to African ancestry, 65% attributable to European ancestry and 30% attributable to Native American ancestry. The ethnicity estimation engine 245 generates the ethnic composition estimate and stores the estimated ethnicities in a data store of computing server 130 with a pointer in association with a particular user.

In some embodiments, the ethnicity estimation engine 245 divides a target genetic dataset into a plurality of windows (e.g., about 1000 windows). Each window includes a small number of SNPs (e.g., 300 SNPs). The ethnicity estimation engine 245 may use a directed acyclic graph model to determine the ethnic composition of the target genetic dataset. The directed acyclic graph may represent a trellis of an inter-window hidden Markov model (HMM). The graph includes a sequence of a plurality of node groups. Each node group, representing a window, includes a plurality of nodes. The nodes represent different possibilities of labels of genetic communities (e.g., ethnicities) for the window. A node may be labeled with one or more ethnic labels. For example, a level includes a first node with a first label representing the likelihood that the window of SNP sites belongs to a first ethnicity and a second node with a second label representing the likelihood that the window of SNPs belongs to a second ethnicity. Each level includes multiple nodes so that there are many possible paths to traverse the directed acyclic graph.

The nodes and edges in the directed acyclic graph may be associated with different emission probabilities and transition probabilities. An emission probability associated with a node represents the likelihood that the window belongs to the ethnicity labeling the node given the observation of SNPs in the window. The ethnicity estimation engine 245 determines the emission probabilities by comparing SNPs in the window corresponding to the target genetic dataset to corresponding SNPs in the windows in various reference panel samples of different genetic communities stored in the reference panel sample store 240. The transition probability between two nodes represents the likelihood of transition from one node to another across two levels. The ethnicity estimation engine 245 determines a statistically likely path, such as the most probable path or a probable path that is at least more likely than 95% of other possible paths, based on the transition probabilities and the emission probabilities. A suitable dynamic programming algorithm such as the Viterbi algorithm or the forward-backward algorithm may be used to determine the path. After the path is determined, the ethnicity estimation engine 245 determines the ethnic composition of the target genetic dataset by determining the label compositions of the nodes that are included in the determined path. U.S. Pat. No. 10,558,930, entitled "Local Genetic Ethnicity Determination System," granted on Feb. 11, 2020 and U.S. Pat. No. 10,692,587, granted on Jun. 23, 2020, entitled "Global Ancestry Determination System" describe different example embodiments of ethnicity estimation.

The front-end interface 250 displays various results determined by the computing server 130. The results and data may include the IBD affinity between a user and another individual, the community assignment of the user, the ethnicity estimation of the user, phenotype prediction and evaluation, genealogy data search, family tree and pedigree, relative profile and other information. The front-end interface 250 may allow users to manage their profile and data trees (e.g., family trees). The users may view various public family trees stored in the computing server 130 and search for individuals and their genealogy data via the front-end interface 250. The computing server 130 may suggest or allow the user to manually review and select potentially related individuals (e.g., relatives, ancestors, close family members) to add to the user's data tree. The front-end interface 250 may be a graphical user interface (GUI) that displays various information and graphical elements. The front-end interface 250 may take different forms. In one case, the front-end interface 250 may be a software application that can be displayed on an electronic device such as a computer or a smartphone. The software application may be developed by the entity controlling the computing server 130 and be downloaded and installed on the client device 110. In another case, the front-end interface 250 may take the form of a webpage interface of the computing server 130 that allows users to access their family tree and genetic analysis results through web browsers. In yet another case, the front-end interface 250 may provide an application program interface (API).

The tree management engine 260 performs computations and other processes related to users' management of their data trees such as family trees. The tree management engine 260 may allow a user to build a data tree from scratch or to link the user to existing data trees. In some embodiments, the tree management engine 260 may suggest a connection between a target individual and a family tree that exists in the family tree database by identifying potential family trees for the target individual and identifying one or more most probable positions in a potential family tree. A user (target individual) may wish to identify family trees to which he or she may potentially belong. Linking a user to a family tree or building a family may be performed automatically, manually, or using techniques with a combination of both. In an embodiment of an automatic tree matching, the tree management engine 260 may receive a genetic dataset from the target individual as input and search related individuals that are IBD-related to the target individual. The tree management engine 260 may identify common ancestors. Each common ancestor may be common to the target individual and one of the related individuals. The tree management engine 260 may in turn output potential family trees to which the target individual may belong by retrieving family trees that include a common ancestor and an individual who is IBD-related to the target individual. The tree management engine 260 may further identify one or more probable positions in one of the potential family trees based on information associated with matched genetic data between the target individual and those in the potential family trees through one or more machine learning models or other heuristic algorithms. For example, the tree management engine 260 may try putting the target individual in various possible locations in the family tree and determine the highest probability position(s) based on the genetic dataset of the target individual and genetic datasets available for others in the family tree and based on genealogy data available to the tree management engine 260. The tree management engine 260 may provide one or more family trees from which the target individual may select. For a suggested family tree, the tree management engine 260 may also provide information on how the target individual is related to other individuals in the tree. In a manual tree building, a user may browse through public family trees and public individual entries in the genealogy data store 200 and individual profile store 210 to look for potential relatives that can be added to the user's family tree. The tree management engine 260 may automatically search, rank, and suggest individuals for the user conduct manual reviews as the user makes progress in the front-end interface 250 in building the family tree.

As used herein, "pedigree" and "family tree" may be interchangeable and may refer to a family tree chart or pedigree chart that shows, diagrammatically, family information, such as family history information, including parentage, offspring, spouses, siblings, or otherwise for any suitable number of generations and/or people, and/or data pertaining to persons represented in the chart. U.S. Patent Publication Application No., entitled "Linking Individual Datasets to a Database," US2021/0216556, published on Jul. 15, 2021, describes example embodiments of how an individual may be linked to existing family trees.

The tree management engine 260 may also allow users to view various family trees of individuals with profiles on the computing server 130. As discussed in further detail in FIG. 3 through FIG. 9, the rendering of the family tree is streamlined and the family tree is expandable and collapsible.

Example Family Tree Expansion Process

Embodiments described herein are related to a system for speeding up the rendering of a family tree in a graphical user interface and/or for improving the navigation of the family tree by a user. A family tree may include a large number of family members, particularly for well-researched families, such as those of genealogy enthusiasts and persons descended. Retrieval of the data related to the family tree from a computing server and graphically rendering the family tree can be a time-consuming process that consumes the resources of the graphical user interface. In some embodiments, a computing server may first provide a graphical user interface with a limited initial set of family members to be rendered on the interface. The interface may include control elements that allow a user to freely expand the family tree in various directions.

As such, various embodiments provide a seamless user experience in viewing and exploring family relationships while significantly reducing the latency and memory and other computer resource consumption in rendering a family tree. It has been surprisingly found that the time for a large family tree (e.g. a family tree comprising as many as, or more than, 400 tree persons) to load in the graphical user interface using the disclosed process advantageously achieves a ~99% reduction compared to existing approaches, from three to four minutes to load a large family tree to approximately two seconds to load.

Figure 3:
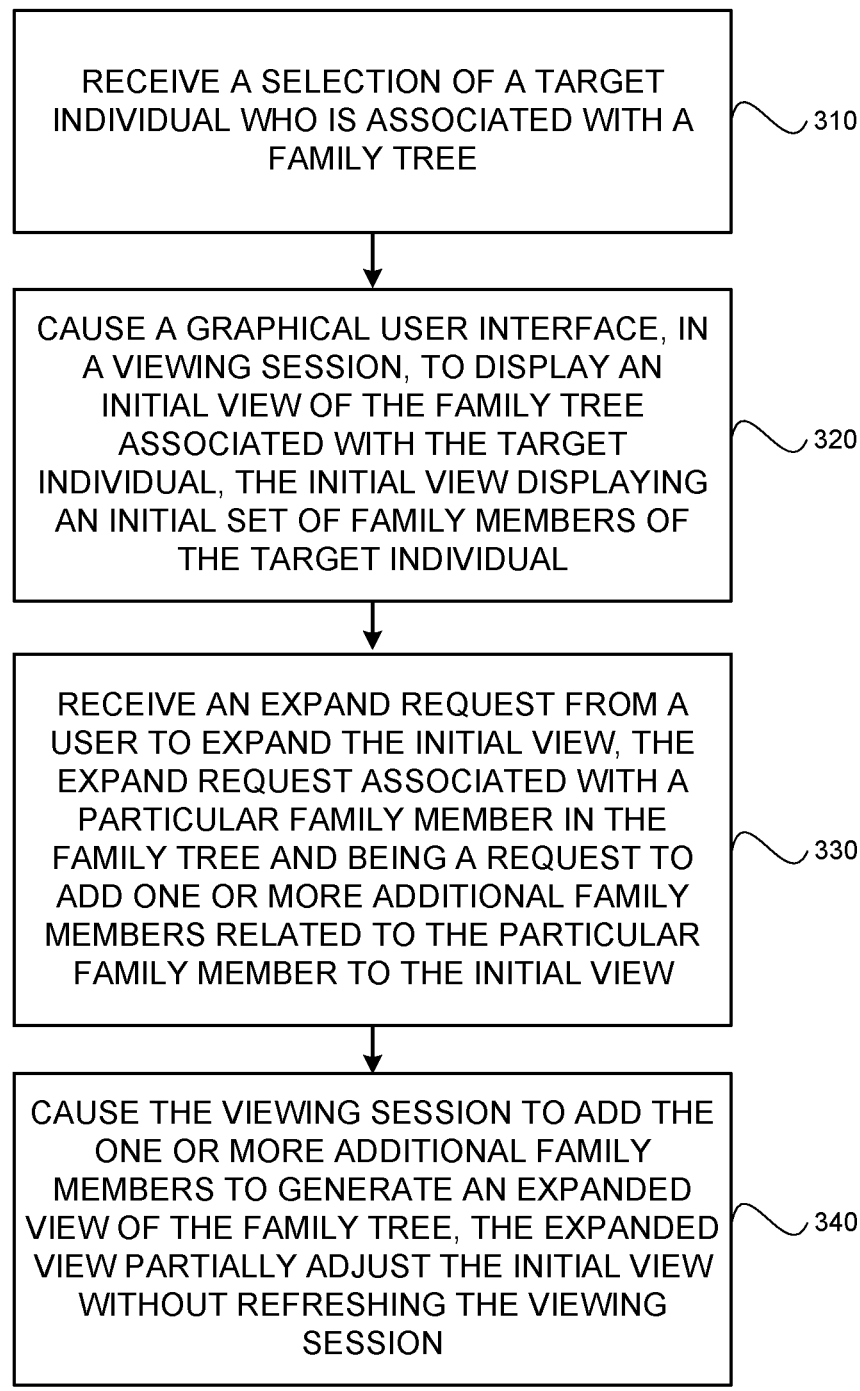
FIG. 3 is a flowchart depicting an example process for rendering a family tree in a graphical user interface, in accordance with some embodiments.

FIG. 3 is a flowchart depicting an example process 300 for rendering a family tree in a graphical user interface, in accordance with some embodiments. The process 300 may be performed by one or more engines of the computing server 130 illustrated in FIG. 2, such as the tree management engine 260 in cooperation with the front-end interface 250. The process 300 may be embodied as a software algorithm that may be stored as computer instructions that are executable by one or more processors. The instructions, when executed by the processors, cause the processors to perform various steps in the process 300. In various embodiments, the process may include additional, fewer, or different steps. While various steps in process 300 may be discussed with the use of computing server 130, each step may be performed by a different computing device.

Figure 4A:
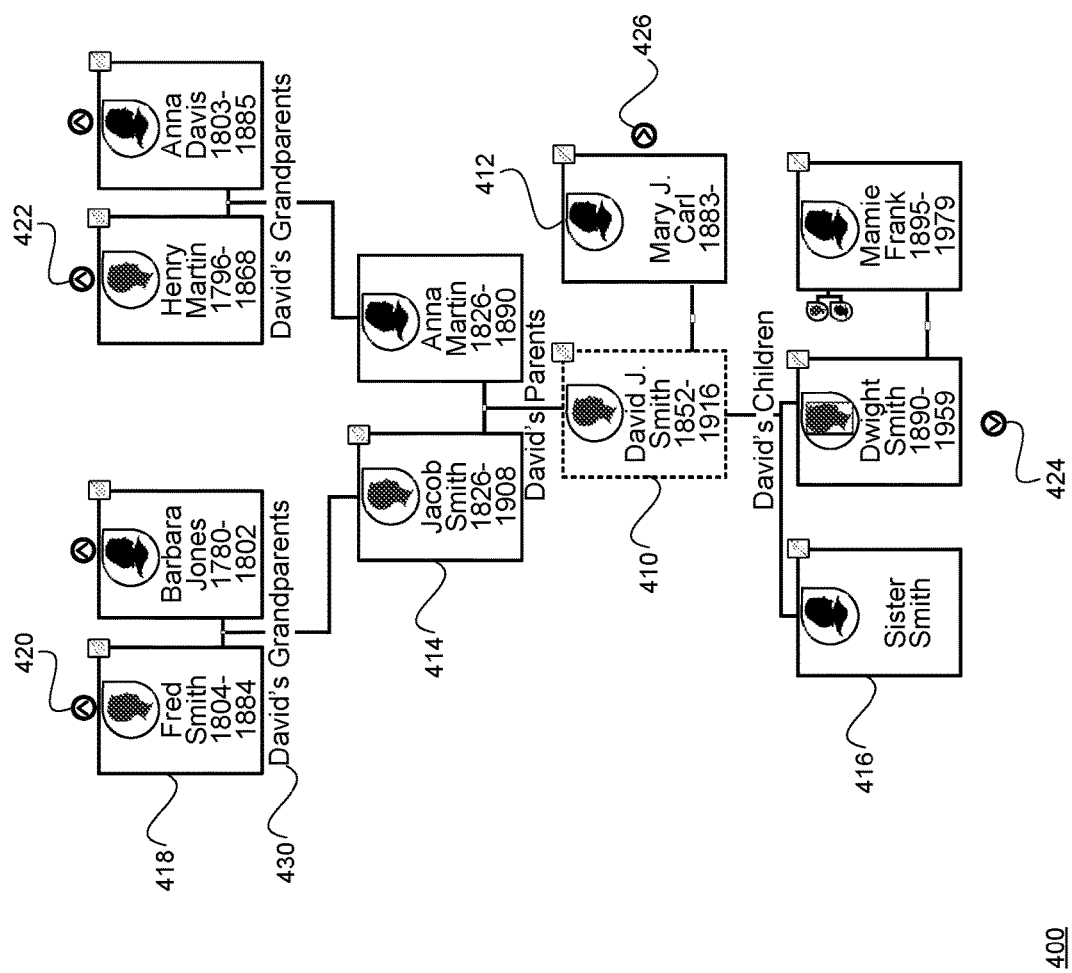
FIG. 4A is an example initial view of a visual representation of the family tree associated with a target individual, in accordance with some embodiments.
Figure 4B:
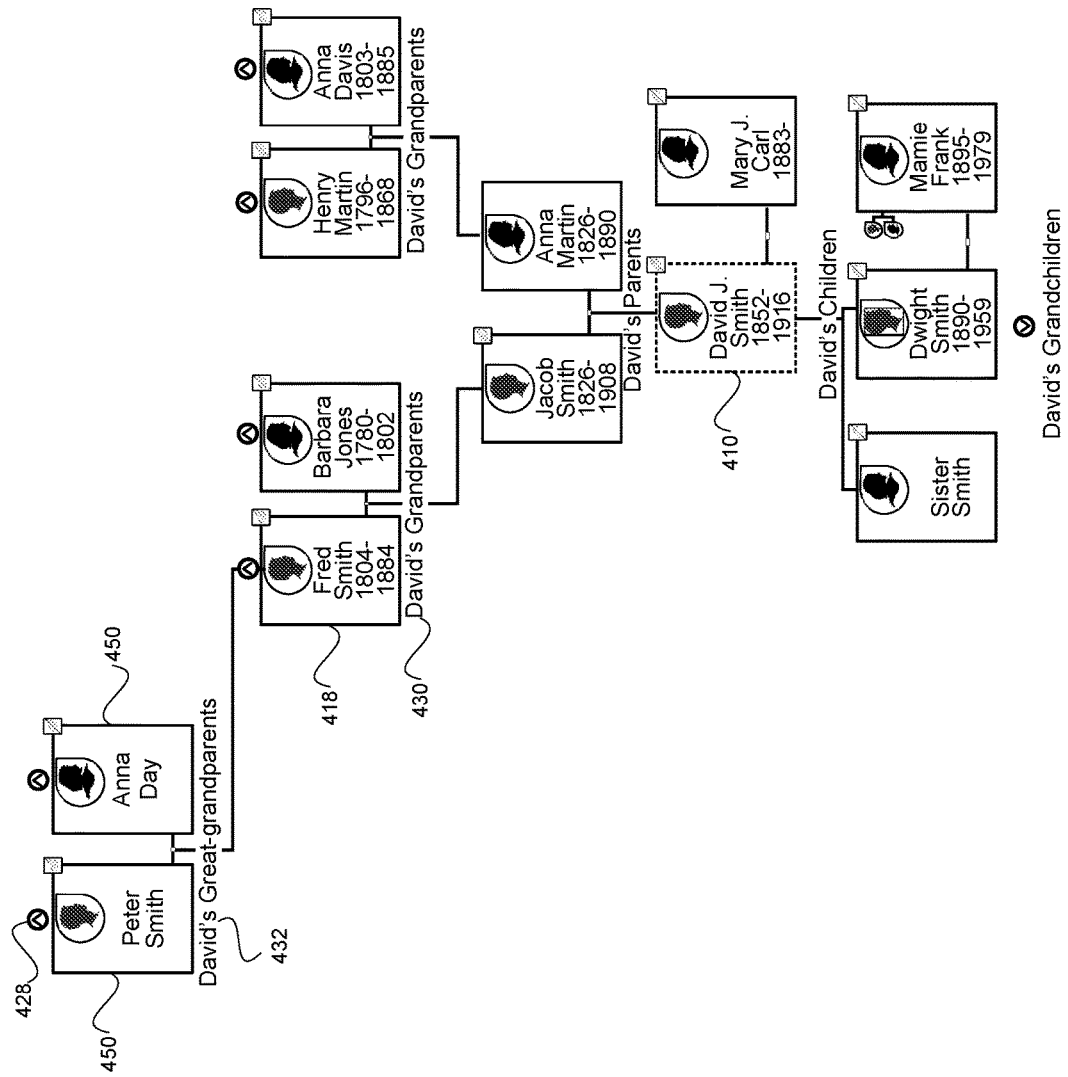
FIG. 4B is an example expanded view of the visual representation of the family tree associated with a target individual, in accordance with some embodiments.

FIGS. 4A and 4B are conceptual diagrams illustrating example family trees that are rendered by the process 300 and an expansion feature that allows a user to expand a family tree in directions relative to particular family members so that the user may freely explore the desired family relationships, in accordance with some embodiments. FIGS. 4A and 4B are discussed in conjunction with FIG. 3.

In some embodiments, process 300 can include receiving a selection of a target individual who is associated with a family tree (Step 310). A target individual may be a person who has a profile in the computing server 130. A user of the computing server 130 may intend to investigate the family relationships of any person and select the person as the target individual. The user may manually select a target individual or may accept the selection that is automatically suggested by the computing server 130. The selection of the target individual may arise in various contexts when the user is using the computing server 130.

For example, a user may be browsing various genealogy records stored in the genealogy data store 200 or the individual profile store 210 and have decided to further investigate a person mentioned in one of the genealogy records. In another example, a user may be viewing other users' family trees and may find a person in one of the family trees worth further exploring. In yet another example, a user may be in the process of building a family tree using the tree management engine 260 and may want to determine whether a person should be added to the family tree. In yet another example, the computing server 130 may automatically identify a potential relative of a user, for example, through the IBD estimation engine 225 that is based on genetic data, or through the tree management engine 260. In some embodiments, the user's own profile is automatically selected as the target individual so as to allow the user to intuitively visualize their own family tree and relationships with various members thereof. In various situations, the user may select the person as the target individual and request the computing server 130 to render the family tree associated with the person in a graphical user interface.

Continuing with reference to FIG. 3, in some embodiments, process 300 can include causing a graphical user interface, in a viewing session, to display an initial view of the family tree associated with the selected target individual (step 320). Displaying the initial view of the family tree may include displaying an initial set of family members of the target individual. In some embodiments, the initial set of family members corresponds to tree persons in a predetermined number of generations and/or relationships to the target individual.

The graphical user interface may take various forms, such as the front-end of a web browser, the user interface of a mobile application, or a platform of desktop software, etc. The viewing session initially loads the data of the family members in the family tree and visually renders a representation of the family tree in the graphical user interface. The visual representation may include nodes that each represent a family member and edges that connect the family members to signify relationships. The viewing session may be a continuous session where the user may continue to examine the rendered family tree without having the graphical user interface completely re-load the entire visual representation. For example, as discussed in further detail below, the user may opt to expand or collapse some portions of the rendered family tree. In the same viewing session, the graphical user interface only partially loads or removes those portions. If the graphical user interface reloads and re-renders the entire family tree, the viewing session has been refreshed.

FIG. 4A is an example initial or default view of a visual representation 400 of the family tree associated with a target individual 410, in accordance with some embodiments. The initial view may be centered on the target individual 410. For example, the initial view, without scrolling or pan, may put the target individual 410 at an approximately central position of the visual representation 400. The visual representation 400 may also include various control elements that allow the user to change the current view of the family tree and labels that describe the family members in the family tree and the relationships among them. For example, the visual representation 400 may include an expand button 420 associated with a particular family member.

The expand button 420 allows the user to expand the family tree in the direction associated with the particular family member. The computing server 130 has a database of a larger family tree and may determine which family members in the current view of the family tree have relatives that are beyond the current view. Family members who are on the periphery of the family view in the current view and who have relatives beyond the current view may each be associated with an expand button to allow the user to expand the family tree. Other examples of expand buttons are labeled as 422, 424, and 426, which allows the user to respectively expand the family tree vertically upward, vertically downward, and laterally. Other control elements (not shown in FIG. 4A) may also be present in the visual representation 400, such as a collapse button, a highlight button, and another suitable button that may change the size, arrangement, and/or appearance of the visual representation 400.

The visual representation 400 may also include various labels describing the family tree. For example, on the edges that connect various family members, the visual representation 400 may include ego-dependent labels 430 that each describes a relationship of a family member relative to the target individual 410. In some embodiments, an ego-dependent label 430 may be determined based on ahnentafel numbers. The visual representation 400 may also include labels and buttons at each node that allow the user to review or request additional information related to the family member represented by the node.

In some embodiments, the initial view of the family tree may display an initial set of family members of the target individual 410. For example, the initial view may include the target individual 410, a spouse 412 of the target individual 410, one or more biological parents 414 of the target individual 410, and one or more children 416 of the target individual 410. In some embodiments, the spouse 412 initially displayed is the first-married spouse of the target individual 410. In some embodiments, the initial view of the family tree may include a default number of generations related to the target individual 410. For example, while, in the particular example shown in FIG. 4A, only three generations are shown (not including the target individual and spouse: children, parents, grandparents), in some embodiments the default number of generations shown in the initial view may be five, which includes two generations up from the target individual 410 and two generations down from the target individual 410.

In some embodiments, the number of family members in the initial set of family members that are to be displayed in the initial view is limited to a predetermined maximum limit. The selection of the initial set may be centered around the target individual 410. For example, the selection of the initial set may start from the target individual 410, and expand to the target individual's 410 immediate relatives such as parents, grandparents, children and children's spouses, and grandchildren. If the number of family members has not reached the predetermined maximum limit, the selection of the initial set may expand to other relatives such as uncles, aunts, nephews, nieces, cousins, etc., from the close to the more distant until the number of family members in the initial set has reached the limit. In some embodiments, the family tree may be expanded stepwise by increasing numbers of generations until the predetermined maximum limit is reached for the initial view; for example, the process 300 may proceed stepwise from generation(s) nearest to the target individual, e.g. starting with adding the target individual's sibling(s), then adding parent(s) sibling(s) and/or child(ren)'s spouse(s), then adding grandparent(s) sibling(s) and/or grandchild(ren)'s spouse(s), and so on. Setting a limit restricting the maximum number of family members the graphical user interface may render initially reduces the loading time of the family tree and enables a smooth user experience in using the graphical user interface.

Continuing with reference to FIG. 3, in some embodiments, process 300 can include receiving an expand request from a user to expand the initial view (step 330). The expand request may be generated by a control element that is associated with a particular family member in the family tree. The expand request is associated with a particular family member and is a request to add one or more additional family members related to the particular family member to the initial view. For example, in FIG. 4A, the expand button 420 may be associated with family member 418 and the request is to add one or more family members along the relationship of family member 418. In some embodiments, the control element may take a shape that is used to indicate a direction, such as a triangle or an arrow. The control element may be arranged at a side of or otherwise proximate to the node representing a particular family member and point to a direction of expansion. For example, the expand button 420 in the example illustrated in FIG. 4A may point upward, which indicates the family tree is expandable in one or more generations upward from the family member 418. Other expand buttons may allow the family tree to expand one or more generations downward, laterally within a generation, or any suitable combination.

Continuing with reference to FIG. 3, in some embodiments, process 300 can include causing the viewing session to add the one or more additional family members to generate an expanded view of the family tree (step 340). The expanded view partially adjusts the initial view without necessarily refreshing the viewing session. FIG. 4B is an example expanded view of the visual representation 400 of the family tree associated with a target individual 410, in accordance with some embodiments. The expanded view has added a few more family members 450 extending from the family member 418. The expanded view may include additional labels 432 that each describes the relationship between a newly added family member 450 and the target individual 410. The periphery of the family tree has changed in the expanded view.

New control elements for further expanding the family tree, such as the expand button 428, may also be added. As such, the expanded view is further expandable through the one or more additional family members 450 newly added to the family tree and through the existing family members that are present in the initial or previous view. The visual representation 400 may be further expandable in any suitable directions infinitely. The infinite expansion here does not mean that the family tree may be expanded infinite times. Instead, the infinite expansion means the family tree may be expanded to as many generations as possible until the computing server 130 determines that no further family members may be added in that particular direction. In some embodiments, the infinite expansion is performed within the same viewing session. In some embodiments, the expansion is performed as long as the resources of the graphical user interface allow (e.g., memory or CPU allows the family tree to be expanded).

In some embodiments, a series of expansions may continue to be centered around the target individual. For example, the labels in the visual representation 400 may continue to describe relationships relative to the target individual 410. The target individual 410 may continue to be highlighted in the multiply expanded view. The continuously expandable feature allows the system to better manage memory allocation and other hardware resources and also provides a way for the users to explore a complex family tree in directions that are controllable by the user. The user may start with an initial view of a family tree that has a manageable size and number of people and with a focus on the target individual. The user may in turn slowly explore and expand the family tree based on the investigation direction(s) that the user prefers.

In terms of resource allocation such as memory and processors, the rendering of the initial view of the family tree that has a limited number of family members streamlines the rendering process, especially for a complex family tree, because the size of the family tree is limited. The graphical user interface and the computing server 130 normally would not need a significant amount of time to render the initial view. In contrast, in a conventional family tree rendering process that renders the entire family tree, the loading and rendering of data could take a significant amount of time, especially for a large or complex family tree. This often adversely affects the user experience, especially when the user tries to view family trees of different sizes. The loading time for different family trees conventionally could vary significantly based on the sizes of the family trees. The user may perceive the long waiting process of loading a complex family tree as a system crash, especially after a fast loading of a simple family tree that takes virtually no time to load. In the process 300 according to some embodiments, the initial loading time for various family trees is similar, regardless of the ultimate sizes of the families. As the user selects to expand the family tree, only a limited amount of additional data is retrieved or loaded. As such, the tree expansion process is also streamlined as the user would hardly notice any additional loading. In some embodiments, the system may monitor the user's actions, predict the direction of expansion, and pre-load the data in the direction of expansion into a cache for even faster access.

While FIGS. 4A and 4B illustrate that the family tree in a viewing session may be expanded, in some embodiments, one or more nodes in the family tree may also be collapsed or hidden in another suitable manner. For example, the user may select to collapse a node or a branch of nodes in the family tree. The hidden nodes are not displayed in the visual representation 400 but the data related to the hidden nodes may be stored in the local cache (e.g., browser memory) of the graphical user interface. In some embodiments, the user may also select to hide one or more generations. The visual representation 400 may indicate the hidden generations by using a special line (e.g., a dotted or broken line) between members of two generations with intermittent generations hidden.

Example Data Caching Process

Figure 5A:
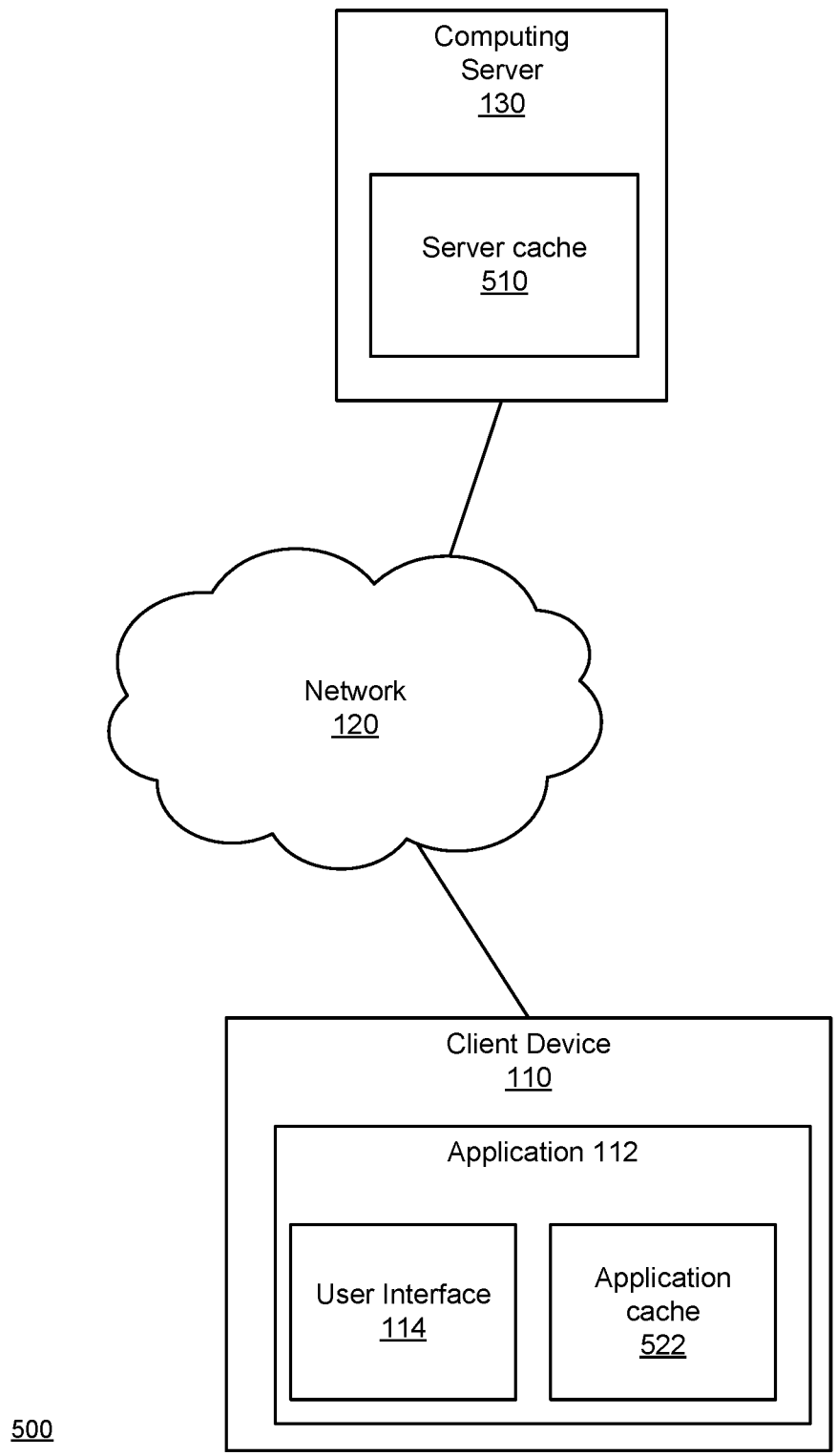
FIG. 5A is a block diagram illustrating a system for caching data in rendering an expandable family tree, in accordance with some embodiments.
Figure 5B:
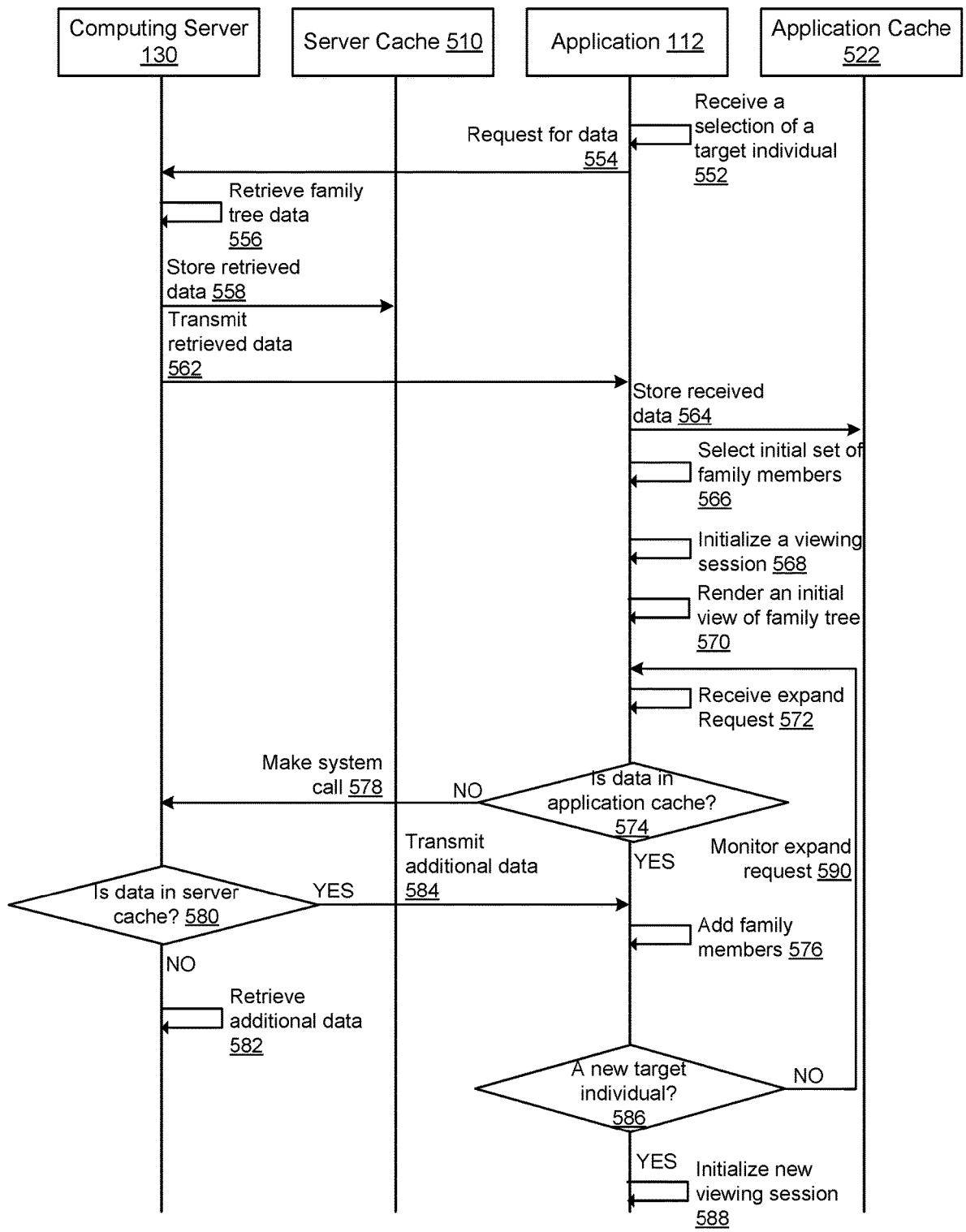
FIG. 5B is a sequence diagram illustrating an example series of interactions among entities of the system to cache data and render an expandable family tree, in accordance with some embodiments.

FIG. 5A is a block diagram illustrating a system 500 for caching data in rendering an expandable family tree, in accordance with some embodiments. FIG. 5B is a sequence diagram illustrating an example series 550 of interactions among entities of the system 500 to cache data and render an expandable family tree, in accordance with some embodiments. The series 550 represents specific sets of instructions that may be stored in one or more computer-readable media, such as the memory of different devices. The instructions, when executed by one or more processors of the depicted entities, cause one or more processors to perform the described interactions. As depicted in FIG. 5B, the series 550 may be performed by the client device 110 and the computing server 130. The sequence of interactions depicted in FIG. 5B is merely an example of the sequence of interactions, and in other embodiments, the sequence of interactions may include fewer, additional, or different actions performed by the same or different entities. While the steps in series 550 are illustrated graphically in FIG. 5B as sequences of steps, some of the steps may occur in different sequences than illustrated or may occur concurrently with other steps. FIG. 5A is discussed in conjunction with FIG. 5B.

Referring to FIG. 5A, the system 500 includes the computing server 130 and the client device 110, which may be controlled by a user of the computing server 130. The client device 110 and the computing server 130 may be in communication with each other via the network 120. The computing server 130 stores the family tree data of various individuals, including users and other individuals such as ancestors. The computing server 130 includes a server cache 510 that may be used to store and hold retrieved family tree data for faster access. The client device 110 includes an application 112 that is in communication with the computing server 130. The application 112 allows the user to view various family trees provided by the computing server 130. For example, a user may select a target individual and request a family tree that is associated with the target individual. In turn, the application 112 may request the data and communicate to the computing server 130. The application 112 includes a user interface 114 and an application cache 522. After receiving the family tree data, the application 112 creates a viewing session and renders a family tree visually in the user interface 114. The relevant data may be stored in the application cache 522.

The application 112 may take various suitable forms. For example, the application 112 may be a software application. The computing server 130 may publish a software application that can be downloaded and installed on a user device 110 via, for example, an application store (App store) of the user device 110. The application 112 may be a desktop software application or a mobile application. In another case, the application 112 may be a web browser that allows users to gain access to a website maintained by the computing server 130. The user interface 114 may be the web browser front end that uses markup language such as HTML to render the website of the computing server 130. In that case, the application cache 522 may be a browser cache. In various cases, the client device 110 may take the form of a graphical user interface (GUI) that displays various information and graphical elements.

Referring to FIG. 5B, in some embodiments, the series 550 may begin with an action from the application 112. In step 552, the application 112 may receive a selection of a target individual from a user, for example, via a control element of the client device 110. In step 554, the application 112 may request family tree data of the target individual through a system call to the computing server 130. In step 556, the computing server 130 may respond by retrieving the relevant family tree data related to the target individual. The computing server 130 may limit the retrieval of data based on a default number of generations to be retrieved. For example, in some embodiments, the computing server 130 may retrieve 2 generations upward, the target individual's generation, and 2 generations downward of the target individual. In step 558, the computing server 130 stores the retrieved family tree data in the server cache 510.

In step 562, the computing server 130 may transmit the retrieved family tree data or a portion of the data to the application 112. In step 564, the application 112 stores the received family tree data in the application cache 522. In step 566, the application 112 may select an initial set of family members up to a predetermined maximum limit. For example, the application 112 may select only up to N (e.g., 30) family members. The data of unselected family members may be sustained in the application cache 522. In various embodiments, the selection of the family members may also be performed by the computing server 130. For example, the computing server 130 may select the initial set of family members and transmit only the data of the selected family members to the application 112. In other embodiments, the selection of the family members for the initial set is performed by the application 112 and the computing server 130 may transmit more data than selected data to the application 112. In step 568, the application 112 may initiate a viewing session and, in step 570, render an initial view of the family tree associated with the target individual. The initial view displays the selected initial set of family members of the target individual.

In step 572, the application 112 may receive an expand request from a user to expand the initial view. The expand request may be associated with a particular family member in the family tree. In decision stage 574, the application 112 may determine whether the data of the additional family members to fulfill the expand request is stored in the application cache 522. For example, in some cases, the additional family members associated with the expand request are unselected family members in step 566 but the data has already been transmitted to the application 112. In step 576, in response to determining that the application cache 522 includes the required data, the application 112 adds the additional family members to the family tree to generate an expanded view of the family tree. The application 112 partially adjusts the initial view without refreshing the viewing session. In step 578, in response to determining that the application cache 522 does not include the required data, the application 112 makes a system call to the computing server 130. In step 580, the computing server 130 determines whether the required data is stored in the server cache 510. If not, in step 582, the computing server 130 retrieves the required data from the database. If the data is in server cache 510, the computing server 130 transmits the additional data to the application 112 in step 584.

The application 112 may continue to monitor the user actions. In decision stage 586, the application 112 may determine whether the user has selected a new target individual. In step 588, in response to determining that the user has selected a new target individual, the application 112 may initialize another viewing session. In step 590, in response to determining that the user has not selected a new target individual, the application 112 may continue to monitor any expand request that may be received from the user.

In various embodiments, the application 112 may monitor or, in some cases, predict the user's request for expansion and the direction of expansion. The application 112 may send requests to the computing server 130 to pre-fetch data, such as data related to periphery family members in the current view of the family tree or data related to the predicted direction of expansion. The computing server 130 may cache the data in the server cache 510 or transmit the data to the application 112 so that the data is ready to be used upon receipt of an expand request.

The use of caching reduces the latency of rendering and expanding a family tree and may provide the user with a seamless viewing experience so data may be retrieved quickly from one or more caches or pre-fetched for quick access. The memory allocation may also be better controlled, particularly between the server cache 510 and the application cache 522.

Additional Example GUI Features

FIG. 6A through FIG. 9 discusses various graphical user interface ("GUI") features of a system for an expandable family tree and also improvements of the GUI features compared to conventional family tree viewing systems, in accordance with some embodiments.

Figure 6A:
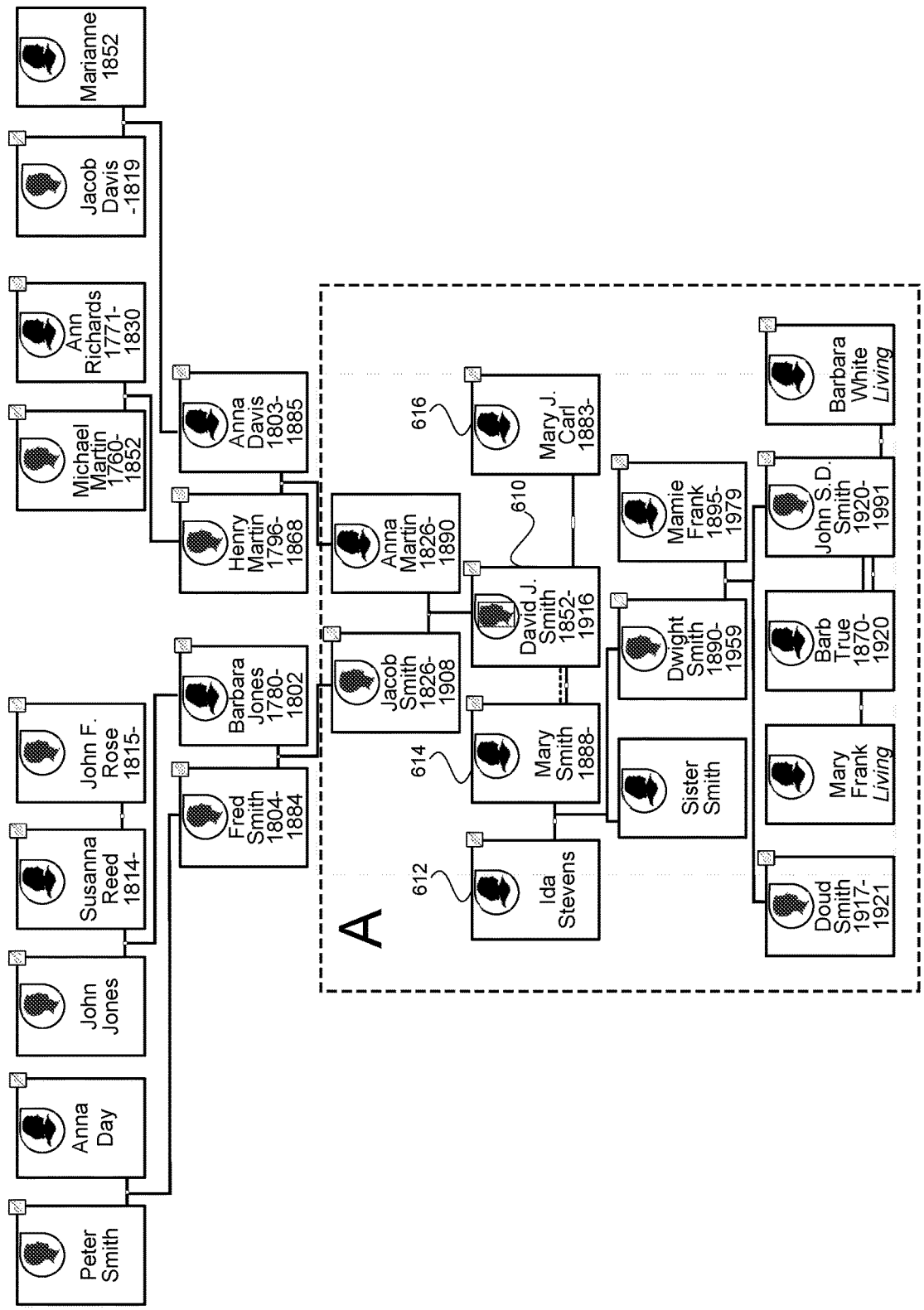
FIGS. 6A and 6B illustrate exemplary embodiments of prior systems for visualizing genealogical data in the form of a family tree and which illustrate at least some of the disadvantages and other problems conventionally.
Figure 6B:
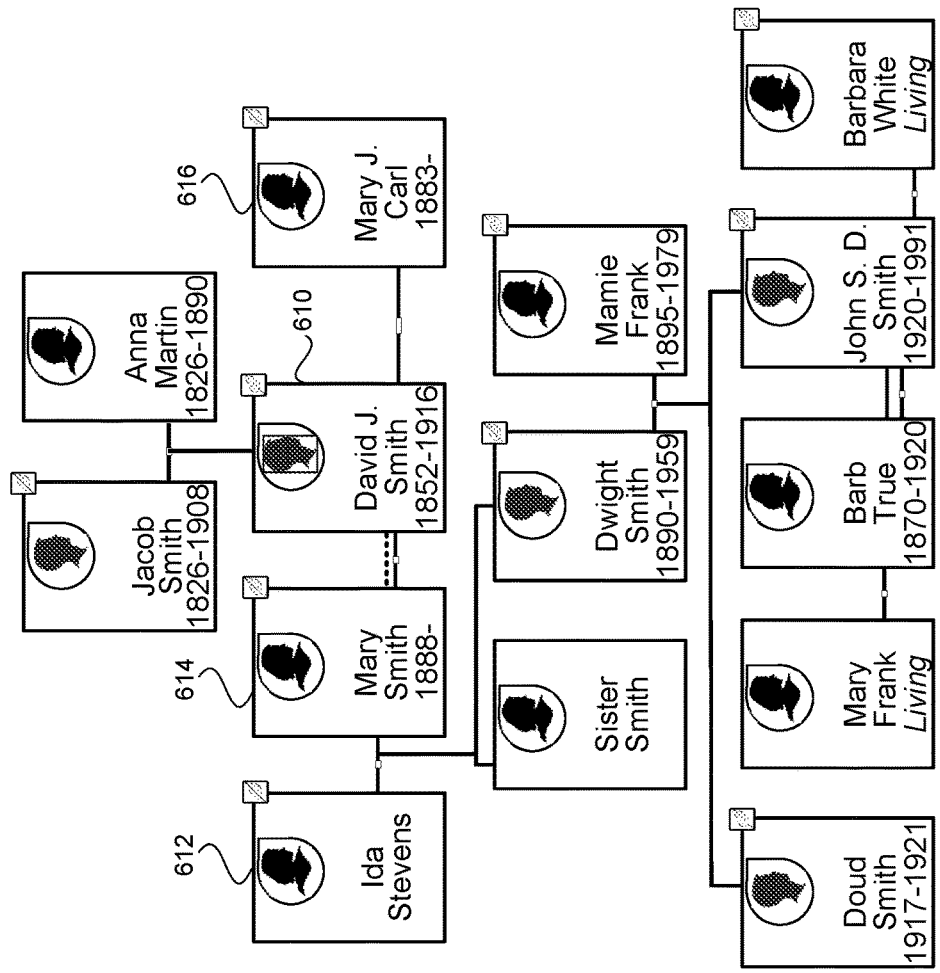

FIGS. 6A and 6B illustrate exemplary embodiments of prior systems for visualizing genealogical data in the form of a family tree and which illustrate at least some of the disadvantages and other problems conventionally. For example, FIG. 6A illustrates a first view of a family tree associated with David J Smith 610. As shown, this view populates each of David's three wives 612, 614, and 616 laterally, and ascending from David 610, his paternal and maternal lineages. Descending from David are his children and grandchildren.

A portion of FIG. 6A, depicted by the hashed box A, is magnified for illustrative purposes and provided in FIG. 6B. As exemplified in FIGS. 6A and 6B, the conventional interface makes it difficult to discern which of David's wives 612, 614, 616 is the mother to his son Dwight and daughter "Sister Smith." In fact, to an untrained eye, it may appear that the foregoing are children of Mary Smith and Ida Stevens, bringing to question the possibility of adoption and whether David sired either child. Upon further, concentrated scrutiny of the illustration, one may be able to interpret Ida Stevens as the mother to Dwight and "sister Smith," each of whom was sired by David. However, it remains a problem in the art that the method and interface for communicating familial relationships fail to clearly communicate them and can often lead to misinterpretation.

With continued reference to FIG. 6A, the family tree interface of existing approaches quickly becomes confusingly large and difficult to navigate, particularly as a user is not provided with a modality for collapsing certain individuals or generations in the family tree. For example, a user researching David J. Smith 610 may have limited interest in David's siblings, but rather may be interested only in David's direct-line ancestors and direct-line descendants. However, the current approach does not allow for the user to collapse, for ease of navigation, Sister Smith or David's spouses with whom he did not sire children. This results in a large family tree view that is difficult to navigate from top to bottom, particularly in conventional approaches where a user sometimes might have to intuit the relationship between two or more trees.

Figure 7A:
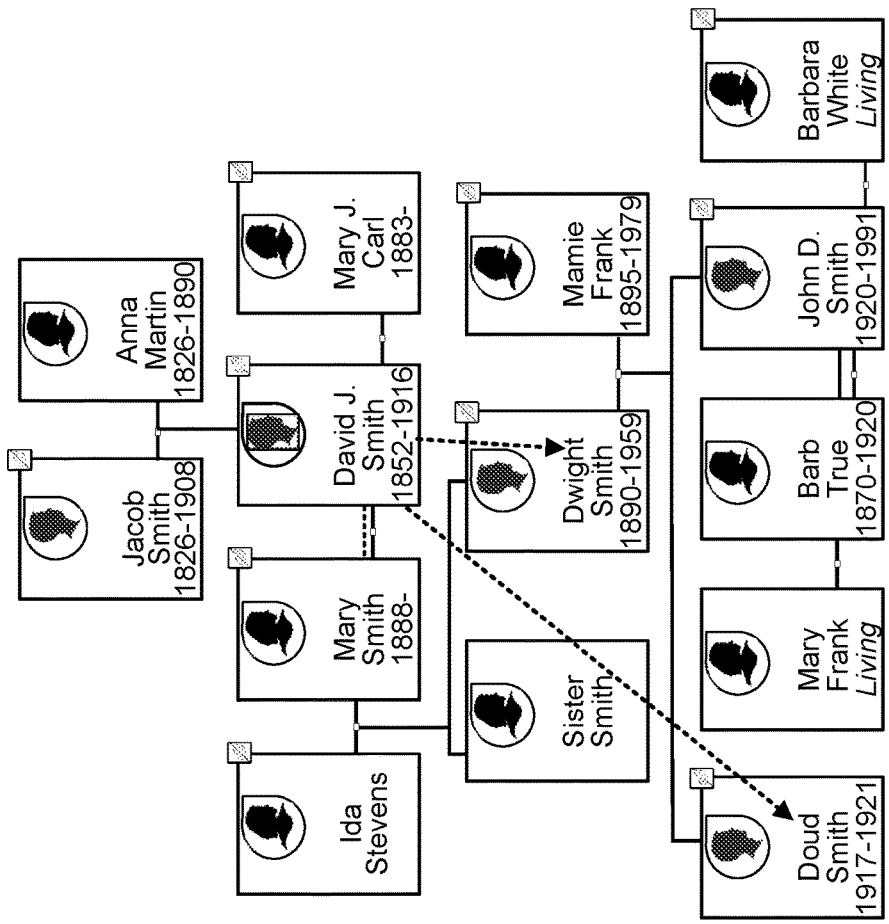
FIG. 7A illustrates a family tree interface according to a conventional interface approach.

FIG. 7A illustrates a family tree interface according to a conventional interface approach, in which the relationship between David Smith and Dwight Smith, and the relationship between David Smith and Doud Smith, shown by arrows in the figure, are not intuitive or clear to a user, as there are no labels that automatically annotate the relationship and edges between nodes. Rather, to understand the relationships, a user would need to discern that Dwight is David's son through his third spouse Ida Stevens, and then that Doud is David's grandson through his son Dwight. Moreover, this is complicated by the fact that the node representing Mary Smith, who was David's spouse before Ida, is situated next to David and the edge connecting David and Ida is partially obscured thereby.

Figure 7B:
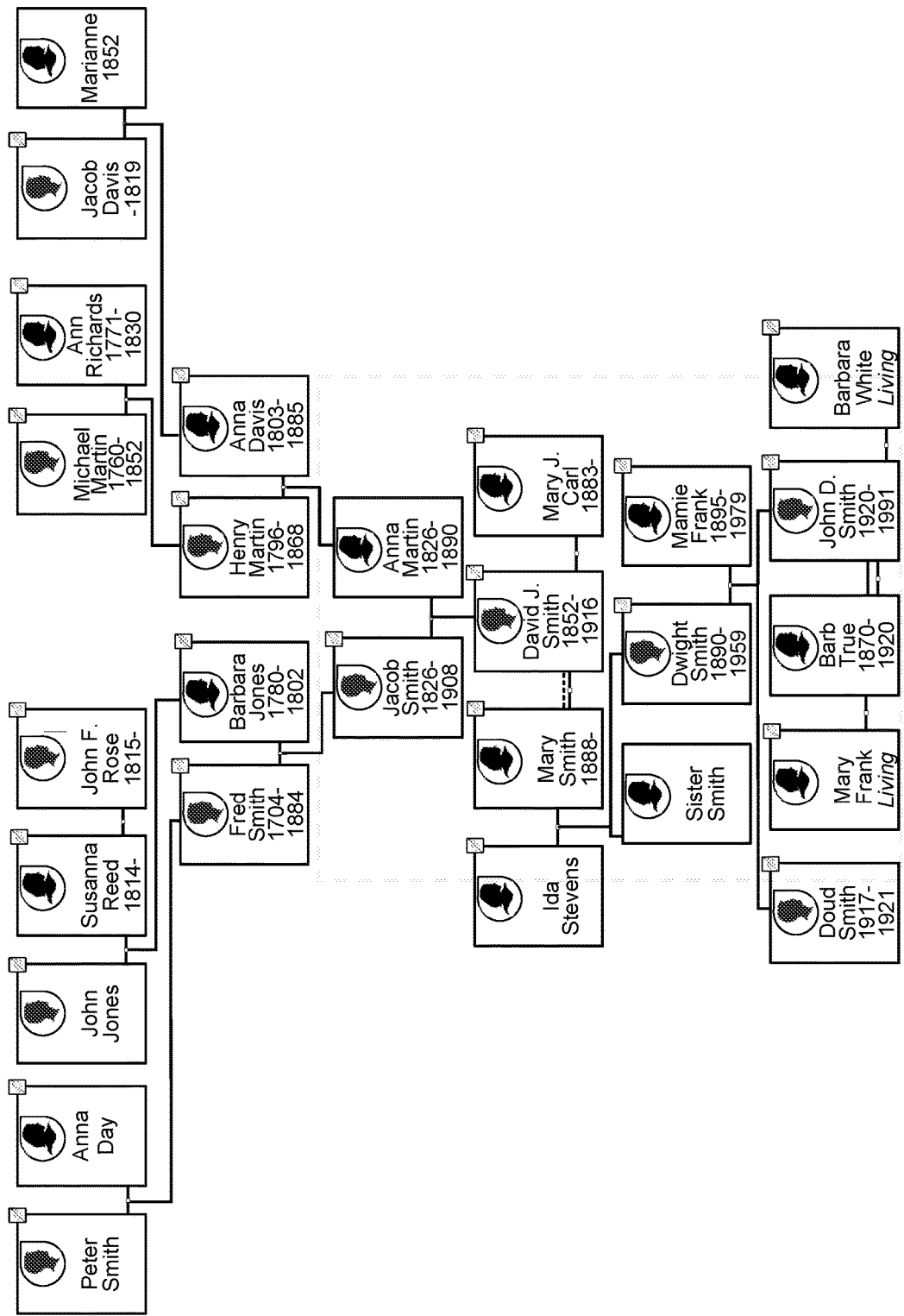
FIG. 7B illustrates a conventional approach to a family tree interface centered on a person.
Figure 7C:
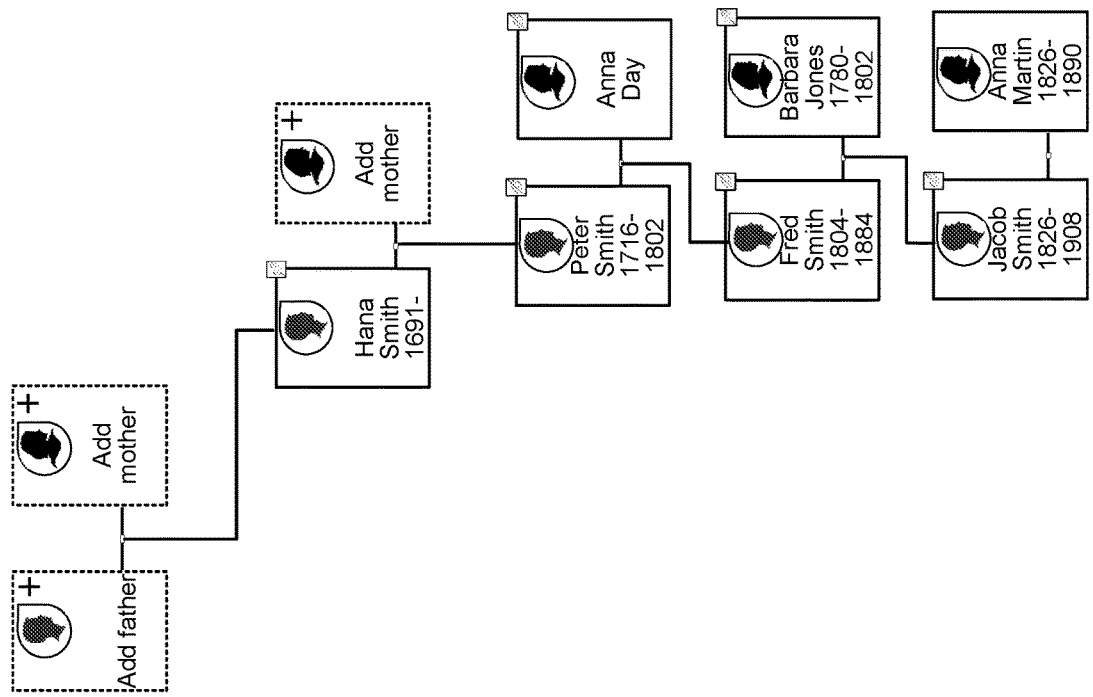
FIG. 7C illustrates a conventional approach to reload a family tree interface.

Turning to FIG. 7B, a conventional approach to a family tree interface associated with David Smith, and automatically or by default extending upward by three generations and downward by two generations, is shown. To the extent that a user wishes to enter or see information pertaining to Peter Smith's (David's paternal great grandfather) parentage, the user may click on the caret associated with Peter Smith. However, according to the conventional approach, this completely reloads the family tree and yields the interface shown in FIG. 7C. As seen in FIG. 7C, the newly loaded family tree is centered around another individual. For example, the newly loaded family tree shows Peter Smith's parentage such that his father Hana Smith is visible and options for adding Peter's mother and Hana's parents are displayed, but only Peter's son Fred and his son Jacob, David's direct-line ancestors, along with the corresponding spouses, are shown.

David Smith is automatically removed from the newly loaded family tree because the newly loaded family tree may be configured to only display a certain number of generations from Peter Smith and David Smith is beyond that number of generations. For many casual users and even for advanced users of a genealogical research service, this is problematic as the user can get lost in shifting and loading family trees and find it complicated and/or frustrating to find their way back to a person of their interest, e.g., David J. Smith. Further, this necessitates the computing resource- and time-intensive process of loading multiple trees, which, for large trees using the conventional approach, is time-consuming and frustrating to users.

Figure 8A:
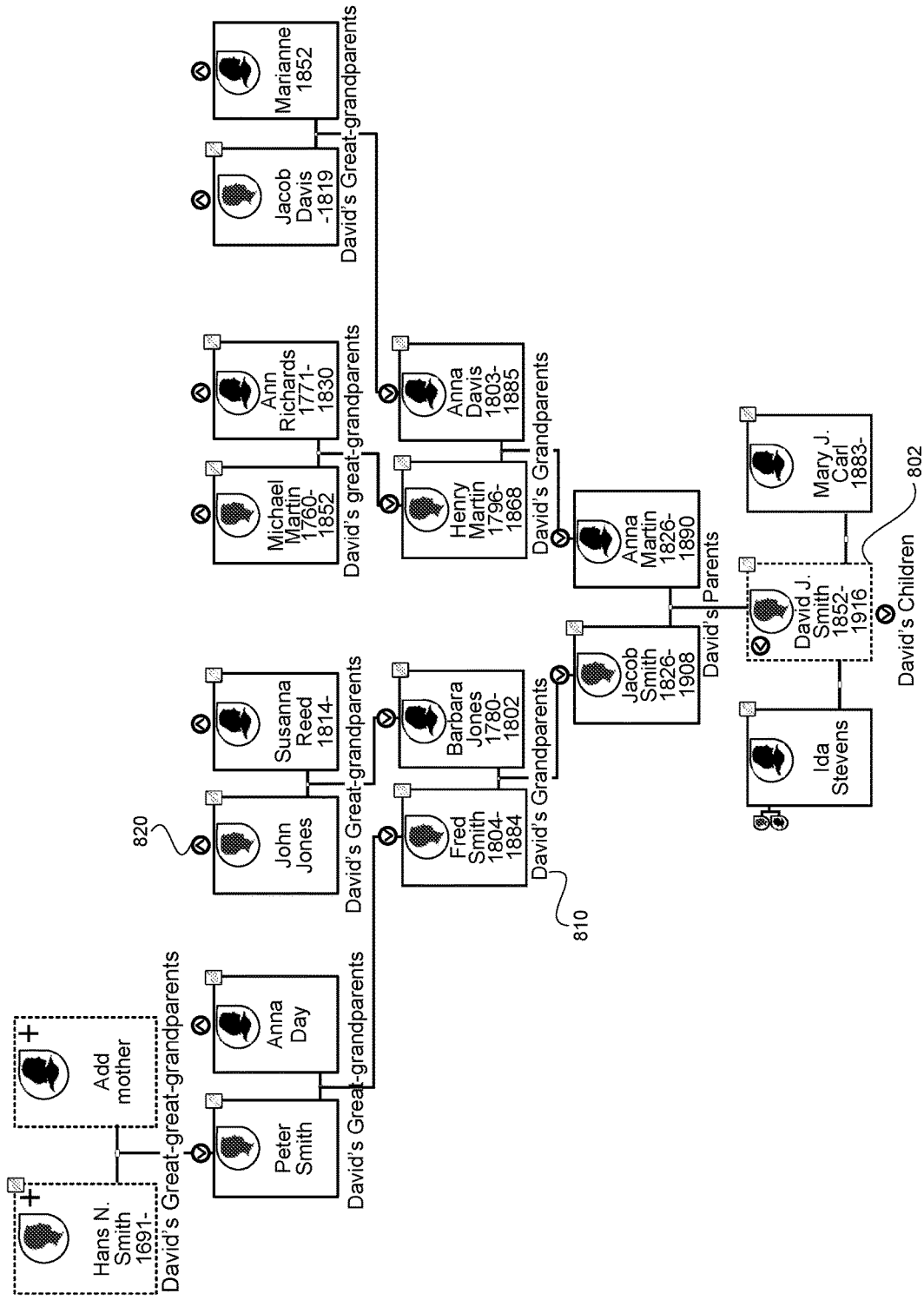
FIG. 8A illustrates how a family tree interface advantageously allows a user to navigate infinitely upward, downward, and/or laterally without losing focus on the target individual, in accordance with some embodiments.

FIG. 8A illustrates a family tree interface, in accordance with some embodiments. The family tree interface advantageously allows a user to navigate infinitely upward, downward, and/or laterally without losing focus on a target individual 802, e.g., David J. Smith. For example, the relationship labels 810 will continue to show how the original target individual is related to a person revealed or shown by expanding the family tree upward, downward, laterally, etc. For example, Peter Smith's parents are labeled as "David's great-great-grandparents." Rendering of other nodes corresponding to other family members may include rendering display elements adjacent to the target individual. For an immediate family member, the node may be connected to the target individual with a visual element such as a line or segment. The rendering may also be limited to an initial set of family members, as discussed in further detail in FIG. 3 through FIG. 5B. While a default number of generations, e.g. four generations, may be included in an initial set of family members, this may be dynamically determined based on the target individual. For instance, if the target individual does not have multiple generations of progeny, the default number of generations may correspondingly be shifted upwards; likewise, if the target individual's family tree does not include multiple generations of ancestors (e.g. due to lack of available data or records), the default number of generations may correspondingly be shifted downwards.

This advantageously reduces latency, as the interface of embodiments of the present disclosure advantageously does not require a refresh of a viewing session, such as a page refresh. Refreshes of viewing sessions, required for conventional family tree interfaces, could require six seconds, on average, for the page to refresh to show a new focus person. By contrast, the family tree interfaces of embodiments advantageously load in about 1.5 seconds on average, a reduction of 75%. This allows a user to have reduced latency at the same time as having a more intuitive family tree to navigate. The reduction for large trees, which can take minutes to load, is even more pronounced.

The family tree interface of embodiments further includes, in some embodiments, a "start over" button (not shown in figures) that allows a user to return the family tree to its original or default state, further simplifying the process of navigating back to an original target individual.

By contrast, conventional family tree interfaces automatically refocus on a new person of interest at a certain degree of attenuation (e.g., more than three generations away) from the original person of interest, even to the point of obscuring or collapsing the original person of interest. The embodiments of the present disclosure thus advantageously make navigation of a family tree more intuitive. For example, a user knows her place in a tree and does not have to click the back cursor in order to understand who she is looking at. This is also facilitated by providing, by default, a limited, predetermined number of generations which a user can expand deliberately based on who they are researching or adding to.

While, in some embodiments, upon clicking on an expand/collapse caret 820, the pertinent tree nodes are loaded into the interface and positioned appropriately, in some embodiments the tree nodes may be added using animation and/or positioned with more room to fill in. In some embodiments, the tree nodes are simply snapped to the appropriate position without animation.

In some embodiments, the last-used target individual, current zoom level, pan position, and expanded relationships are saved for a user, such that when the user returns, the interface is customized based on their previous interactions therewith. The saving may be automatic. In some embodiments, beyond a threshold number of expansions, the user receives a message that further expansions will not be automatically saved for their customized interface.

Figure 8B:
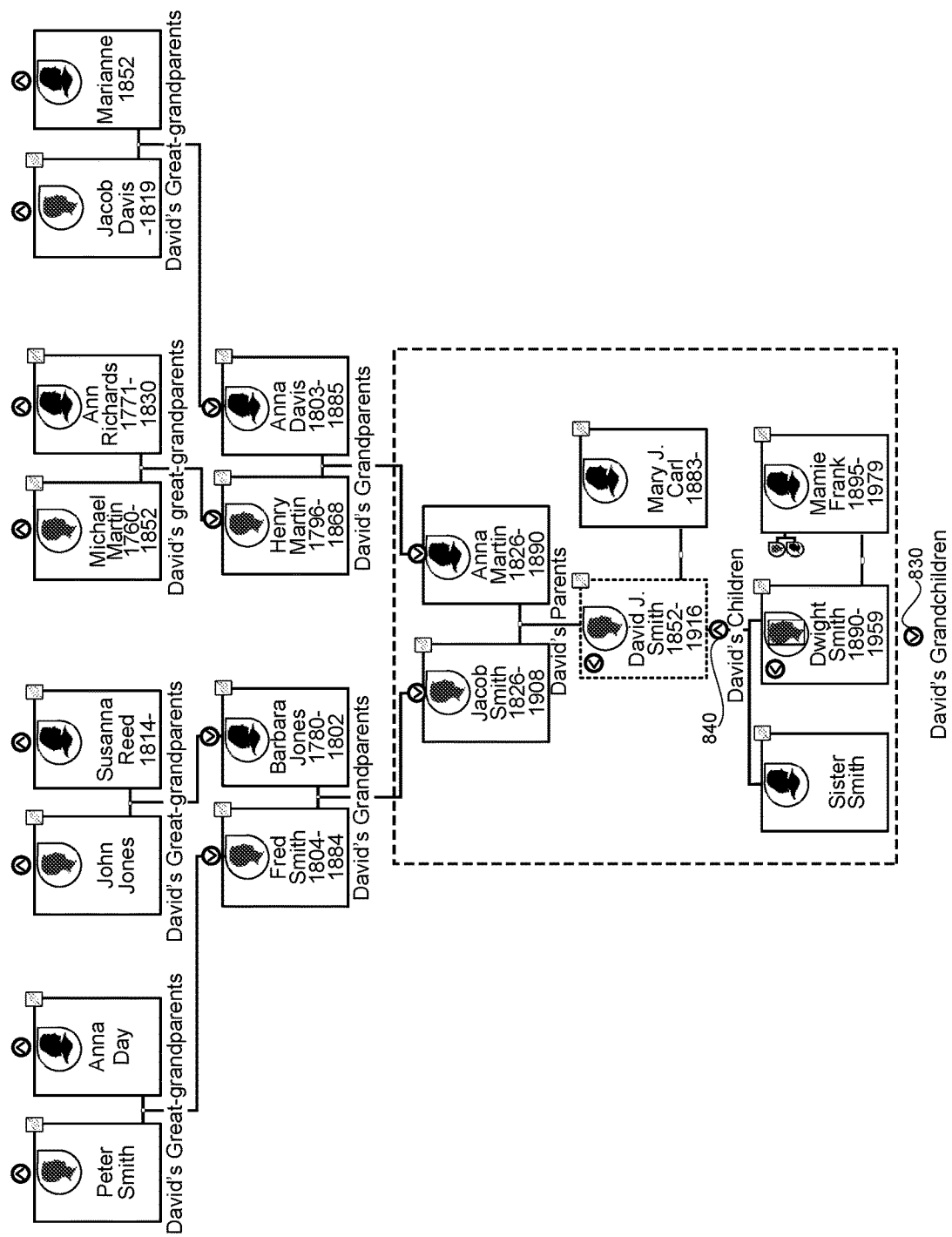
FIG. 8B through 8F illustrate various views and functionalities of the disclosed methods and interfaces for displaying familial relationships, in accordance with some embodiments.

FIG. 8B through 8F illustrate various views and functionalities of the disclosed methods and interfaces for displaying familial relationships, in accordance with some embodiments. FIG. 8B, for example, illustrates an improved interface as applied to viewing a family tree centered on a target individual, David J Smith. When the family tree is initially rendered, the node representing the target individual may be rendered in an approximate center of the display area. Similar to that shown in FIG. 6A, the improved interface of FIG. 8B illustrates his paternal and maternal lineages ascending from him and shows his children and grandchildren descending from him. However, in contrast to FIG. 6A, the improved interface of FIG. 8B is simplified to improve the viewer's understanding of the personal relationships illustrated for the target individual, David J Smith. For example, only an initial set of family members are selected and rendered for display for the initial view of the family tree. Instead of showing all of David's wives, and more clearly illustrating David's ancestry and lineage, David is shown together with his first-married wife, Mary J. Carl.

Figure 8C:
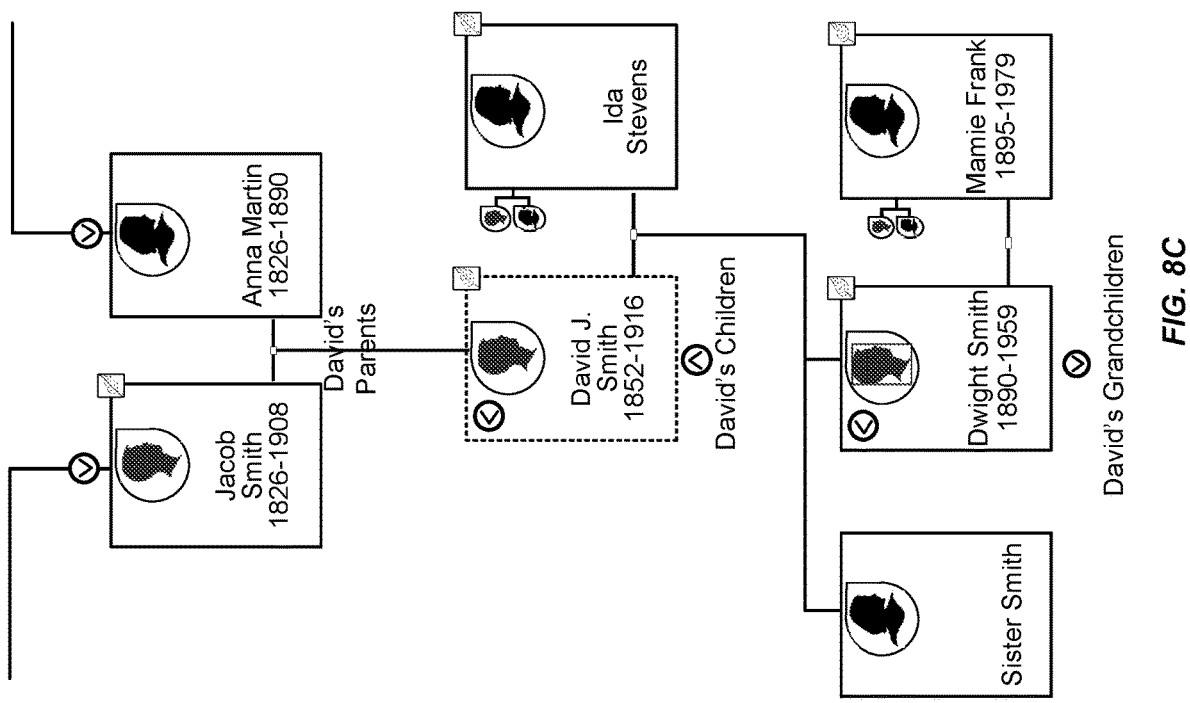
Figure 8D:
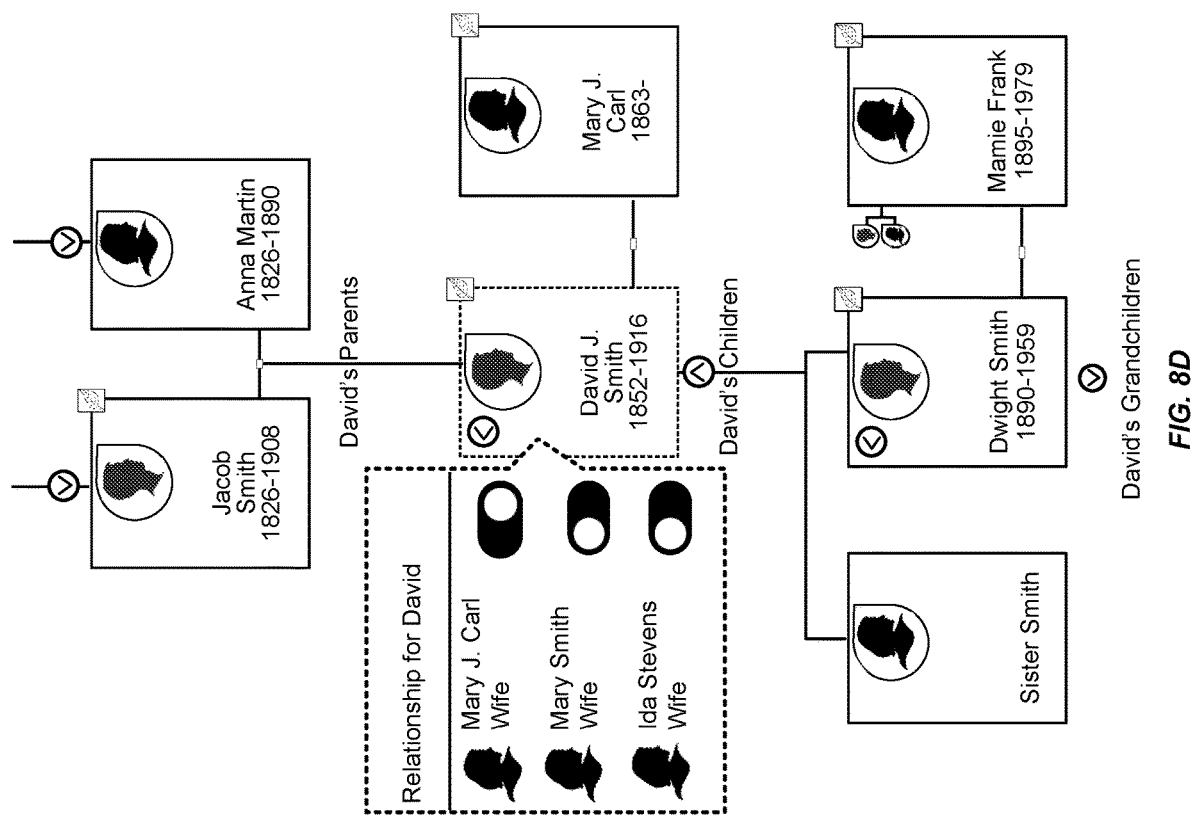

Because David's children, Dwight and "Sister Smith" were not a product of David's marriage with Mary J. Carl, their lineage is defined solely from David, which signals to the user that other wives or mates of David may be hidden from view. In some embodiments, those relationships can be shown directly in the viewable area by selecting David and toggling each of the spouses independently on or off the viewing area (e.g., as shown in FIGS. 8C and 8D). In a default mode, the spouses may be listed from oldest marriage to youngest marriage and left to right, though other arrangements are possible. In some embodiments, a user may select a relationship as "preferred" or "default." A similar arrangement is possible for siblings (listed oldest to youngest and left to right).

Referring now to FIG. 8D, illustrated is an actionable interface toggle for viewing family members in the family tree, such as multiple spouses shown. In some embodiments, the default toggle may be to show only the first-married spouse. Because Mary J. Carl is not Dwight's mother, the edge between Dwight and David still extends directly from David. The interface also provides selectable features, such as a caret 830 for expanding generations up or down labeled by grandchildren generally ("David's Grandchildren"), not necessarily by Dwight's children versus Sister Smith's children. As shown, the caret "David's Grandchildren" is labeled based on the ego (David) and faces downward suggesting expansion can be selected. By contrast, the "David's Children" caret 840 faces upward suggesting collapse can be selected. In this way, the improved interface allows for selective and user-determined expansion or collapse of pedigree elements based on the desired level of detail at each genealogical level.

Figure 8E:
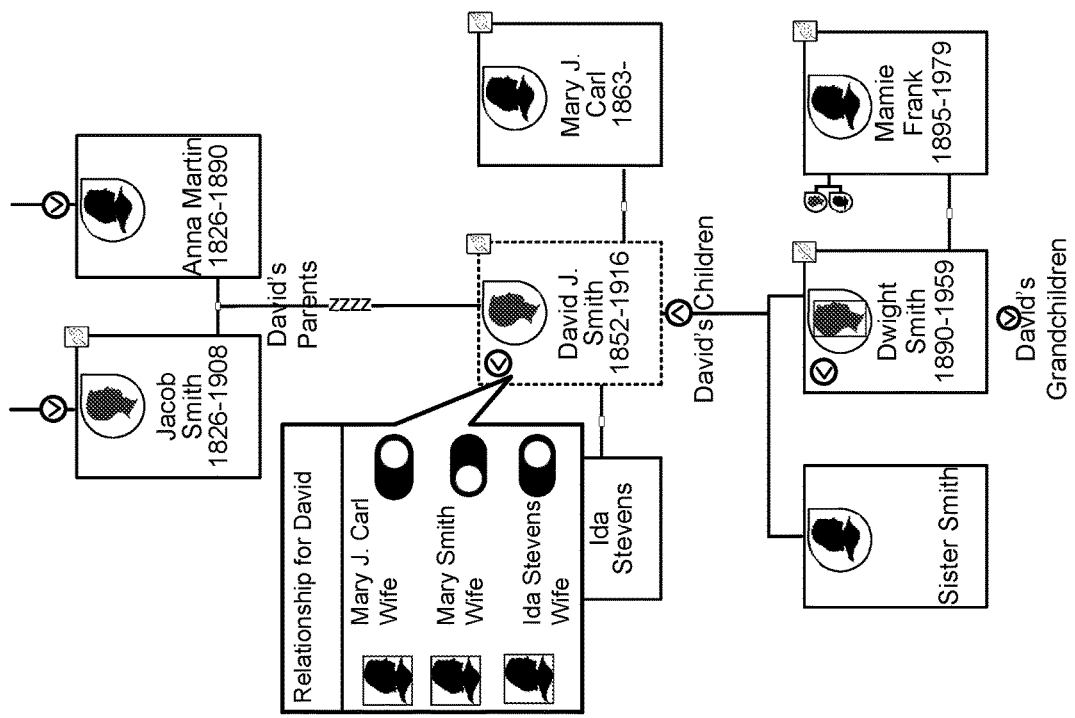

FIG. 8E illustrates the toggle view of FIG. 8D with the toggle for Ida, David's third spouse, having been selected. In response to the selection of this toggle, the edge between Dwight and David is updated such that it is shown between David and Ida, his biological parents. As shown, the edges may be color coded (e.g., blue edge between father, pink between mother) and the edge from the parents David and Ida may extend to Dwight and "sister Smith" from the node connection between blue and pink edges.

Figure 8F:
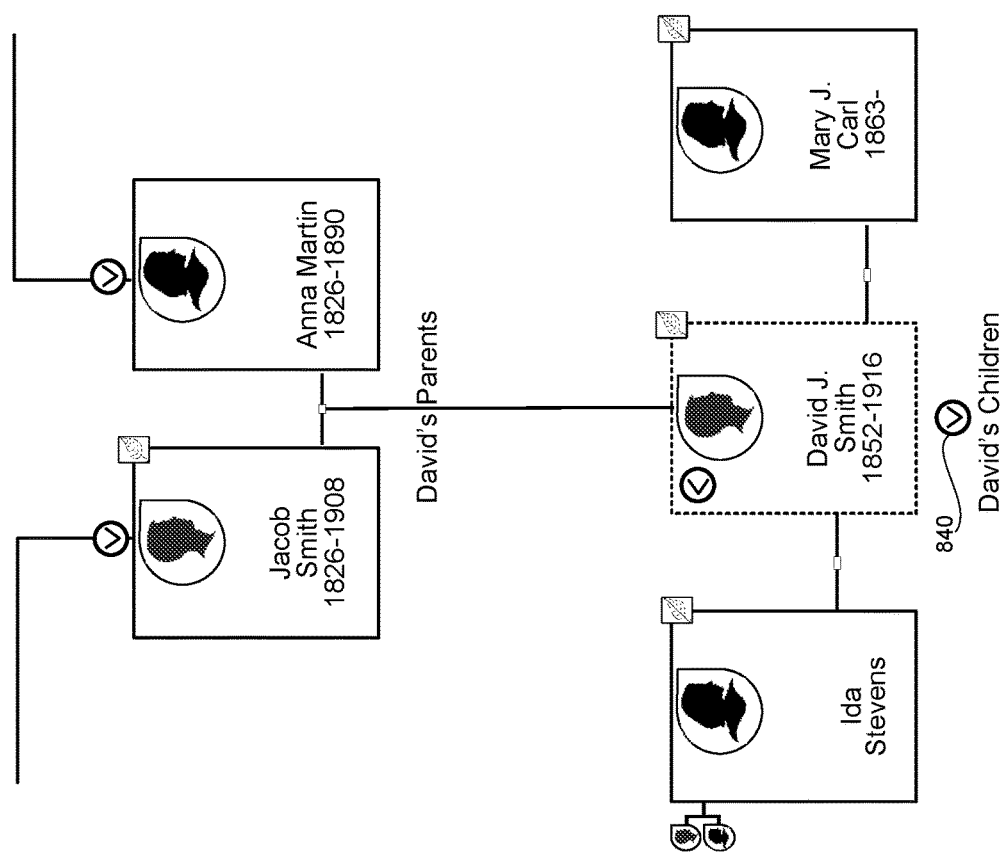

FIG. 8F illustrates a view of a family tree with a collapsed view of the children in response to the user selection of the caret 840 labeled "David's Children." In response to the user selection of said caret, the caret changes orientation to point downward, thereby suggesting that the hidden information can be expanded in response to the user-selection of the caret 840. For example, upon user selection and expansion, the caret 840 may revert its orientation to point upward, thereby suggesting the children generation can be collapsed if acted upon by a user-received gesture or action.

Figure 9:
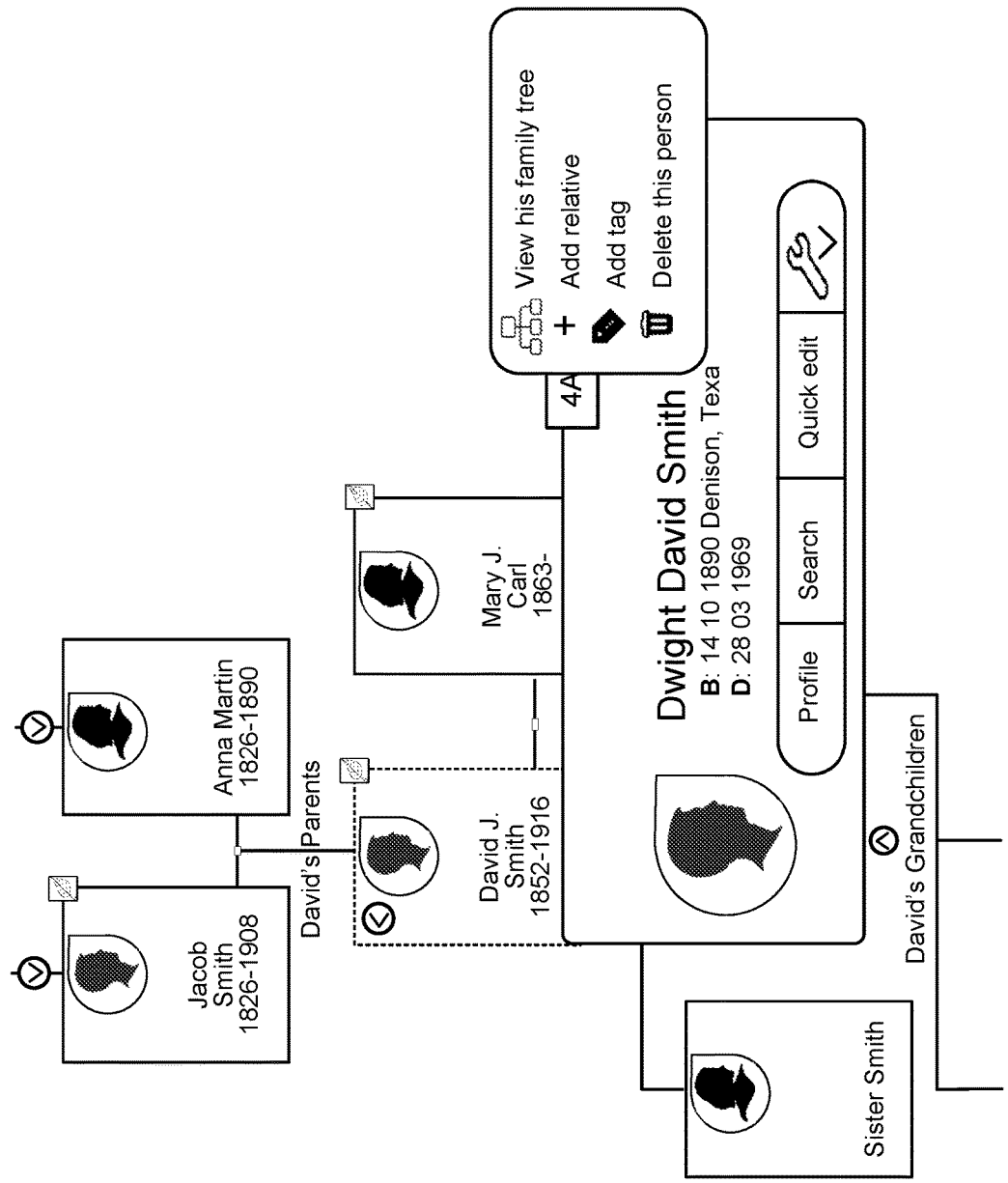
FIG. 9 illustrates a family tree interface that has an alternative ego selected as the represented ego, in accordance with some embodiments.

In some embodiments, an alternate ego can be selected using the user interface, and the relationship labels (e.g., parents, children, grandchildren) and default number of individuals related to the new ego can be illustrated. As shown in FIG. 9, an alternative ego to David J Smith, namely Dwight Smith, can be selected as the represented ego in response to user inputs selecting Dwight (the desired ego) and selecting an option for viewing his family tree or similar output. In the rendered family tree, the relationship labels may be generated based on the relationship from the represented ego. The represented ego may be an example of the target individual. In response to such selection, the user interface can be updated to show Dwight Smith as the ego with his first-married wife as the default partner. Dwight's direct children and grandchildren will be displayed descending from him and his paternal ancestry ascending from him. Of note, in some embodiments, the ascending ancestral line from Dwight will show his biological parents without populating any prior or subsequent spouses of his mother and/or father.

Computing Machine Architecture

Figure 10:
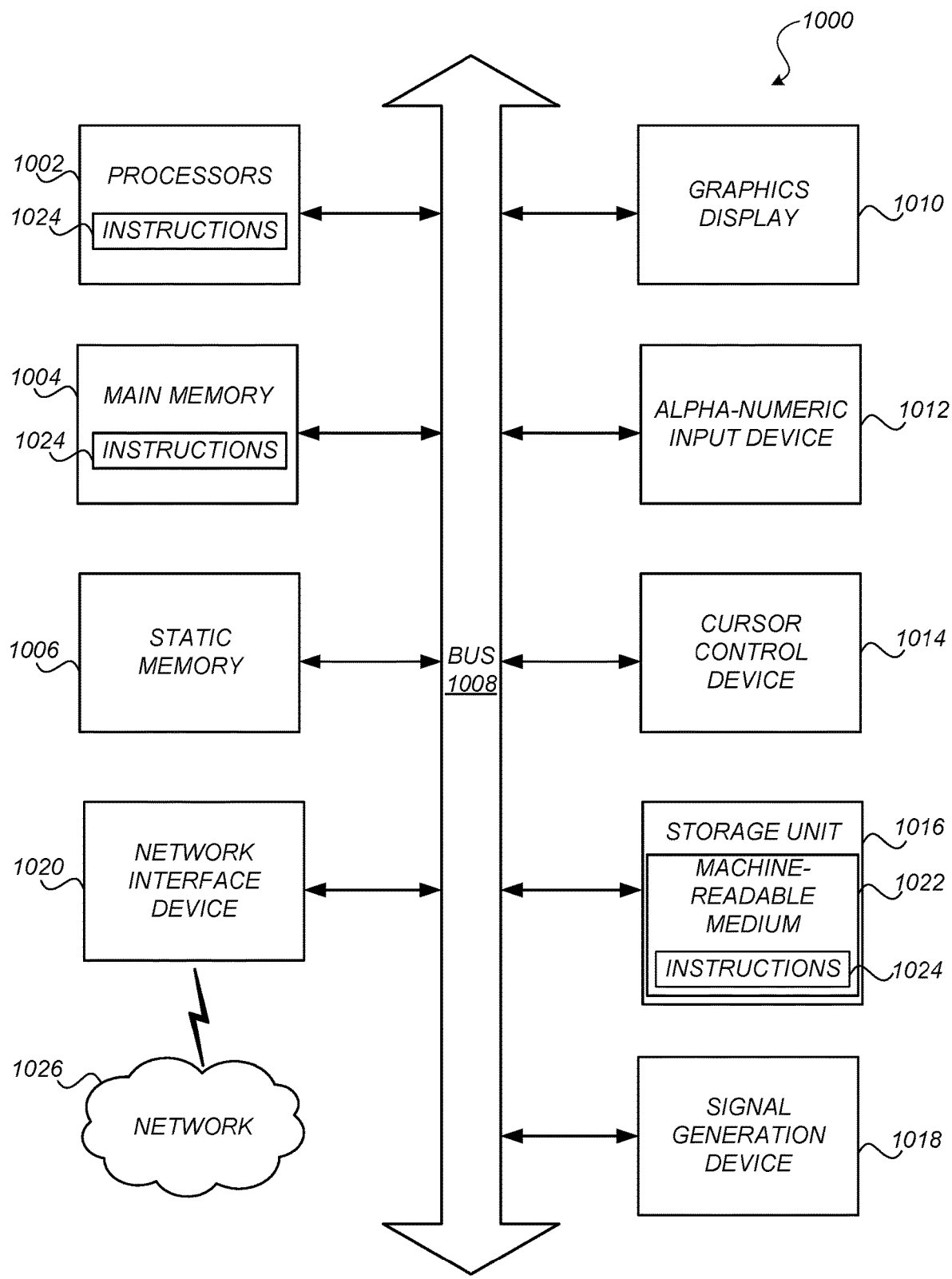
FIG. 10 is a block diagram of an example computing device, in accordance with some embodiments.

FIG. 10 is a block diagram illustrating components of an example computing machine that is capable of reading instructions from a computer-readable medium and execute them in a processor (or controller). A computer described herein may include a single computing machine shown in FIG. 10, a virtual machine, a distributed computing system that includes multiple nodes of computing machines shown in FIG. 10, or any other suitable arrangement of computing devices.

By way of example, FIG. 10 shows a diagrammatic representation of a computing machine in the example form of a computer system 1000 within which instructions 1024 (e.g., software, source code, program code, expanded code, object code, assembly code, or machine code), which may be stored in a computer-readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 10 may correspond to any software, hardware, or combined components shown in FIGS. 1 and 2, including but not limited to, the client device 110, the computing server 130, and various engines, interfaces, terminals, and machines shown in FIG. 2. While FIG. 10 shows various hardware and software elements, each of the components described in FIGS. 1 and 2 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 1024 that specify actions to be taken by that machine. Further, while only a single machine is illustrated, the term "machine" and "computer" may also be taken to include any collection of machines that individually or jointly execute instructions 1024 to perform any one or more of the methodologies discussed herein.

The example computer system 1000 includes one or more processors 1002 such as a CPU (central processing unit), a GPU (graphics processing unit), a TPU (tensor processing unit), a DSP (digital signal processor), a system on a chip (SOC), a controller, a state equipment, an application-specific integrated circuit (ASIC), a field-programmable gate array (FPGA), or any combination of these. Parts of the computing system 1000 may also include a memory 1004 that store computer code including instructions 1024 that may cause the processors 1002 to perform certain actions when the instructions are executed, directly or indirectly by the processors 1002. Instructions can be any directions, commands, or orders that may be stored in different forms, such as equipment-readable instructions, programming instructions including source code, and other communication signals and orders. Instructions may be used in a general sense and are not limited to machine-readable codes. One or more steps in various processes described may be performed by passing through instructions to one or more multiply-accumulate (MAC) units of the processors.

One and more methods described herein improve the operation speed of the processors 1002 and reduces the space required for the memory 1004. For example, the data processing techniques described herein reduce the complexity of the computation of the processors 1002 by applying one or more novel techniques that simplify the steps in loading data and rendering visual representations. The algorithms described herein also reduces the size of the data and the storage space requirement for memory 1004.

The performance of certain operations may be distributed among more than one processor, not only residing within a single machine, but deployed across a number of machines. In some example embodiments, the one or more processors or processor-implemented modules may be located in a single geographic location (e.g., within a home environment, an office environment, or a server farm). In other example embodiments, one or more processors or processor-implemented modules may be distributed across a number of geographic locations. Even though in the specification or the claims may refer some processes to be performed by a processor, this should be construed to include a joint operation of multiple distributed processors.

The computer system 1000 may include a main memory 1004, and a static memory 1006, which are configured to communicate with each other via a bus 1008. The computer system 1000 may further include a graphics display unit 1010 (e.g., a plasma display panel (PDP), a liquid crystal display (LCD), a projector, or a cathode ray tube (CRT)). The graphics display unit 1010, controlled by the processors 1002, displays a graphical user interface (GUI) to display one or more results and data generated by the processes described herein. The computer system 1000 may also include alphanumeric input device 1012 (e.g., a keyboard), a cursor control device 1014 (e.g., a mouse, a trackball, a joystick, a motion sensor, or other pointing instruments), a storage unit 1016 (a hard drive, a solid-state drive, a hybrid drive, a memory disk, etc.), a signal generation device 1018 (e.g., a speaker), and a network interface device 1020, which also are configured to communicate via the bus 1008.

The storage unit 1016 includes a computer-readable medium 1022 on which is stored instructions 1024 embodying any one or more of the methodologies or functions described herein. The instructions 1024 may also reside, completely or at least partially, within the main memory 1004 or within the processor 1002 (e.g., within a processor's cache memory) during execution thereof by the computer system 1000, the main memory 1004 and the processor 1002 also constituting computer-readable media. The instructions 1024 may be transmitted or received over a network 1026 via the network interface device 1020.

While computer-readable medium 1022 is shown in an example embodiment to be a single medium, the term "computer-readable medium" should be taken to include a single medium or multiple media (e.g., a centralized or distributed database, or associated caches and servers) able to store instructions (e.g., instructions 1024). The computer-readable medium may include any medium that is capable of storing instructions (e.g., instructions 1024) for execution by the processors (e.g., processors 1002) and that cause the processors to perform any one or more of the methodologies disclosed herein. The computer-readable medium may include, but not be limited to, data repositories in the form of solid-state memories, optical media, and magnetic media. The computer-readable medium does not include a transitory medium such as a propagating signal or a carrier wave.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Any feature mentioned in one claim category, e.g., method, can be claimed in another claim category, e.g. computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject matter may include not only the combinations of features as set out in the disclosed embodiments but also any other combination of features from different embodiments. Various features mentioned in the different embodiments can be combined with explicit mentioning of such combination or arrangement in an example embodiment or without any explicit mentioning. Furthermore, any of the embodiments and features described or depicted herein may be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In some embodiments, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed in the specific order claimed or described in the disclosure. Some steps may be performed before others even though the other steps are claimed or described first in this disclosure. Likewise, any use of (i), (ii), (iii), etc., or (a), (b), (c), etc. in the specification or in the claims, unless specified, is used to better enumerate items or steps and also does not mandate a particular order.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A. In claims, the use of a singular form of a noun may imply at least one element even though a plural form is not used.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

The following applications are incorporated by reference in their entirety for all purposes: (1) U.S. Pat. No. 10,679,729, entitled "Haplotype Phasing Models," granted on Jun. 9, 2020, (2) U.S. Pat. No. 10,223,498, entitled "Discovering Population Structure from Patterns of Identity-By-Descent," granted on Mar. 5, 2019, (3) U.S. Pat. No. 10,720,229, entitled "Reducing Error in Predicted Genetic Relationships," granted on Jul. 21, 2020, (4) U.S. Pat. No. 10,558,930, entitled "Local Genetic Ethnicity Determination System," granted on Feb. 11, 2020, (5) U.S. Pat. No. 10,114,922, entitled "Identifying Ancestral Relationships Using a Continuous Stream of Input," granted on Oct. 30, 2018, (6) U.S. Patent Publication Application No., entitled "Linking Individual Datasets to a Database," US2021/0216556, published on Jul. 15, 2021, (7) U.S. Pat. No. 10,692,587, entitled "Global Ancestry Determination System," granted on Jun. 23, 2020, and (8) U.S. Patent Application Publication No. US 2021/0034647, entitled "Clustering of Matched Segments to Determine Linkage of Dataset in a Database," published on Feb. 4, 2021.

What is claimed is:

1. A computer-implemented method, comprising:
receiving, at an application residing on a user device remote from a server, the application comprising a graphical user interface, a selection of a target individual who is associated with a family tree, wherein the target individual is associated with family tree data of the target individual stored on the server, the family tree data stored on the server comprising a first portion and a second portion;
receiving, from the server, the first portion of the family tree data at the application residing on the user device remote from the server, the first portion being smaller than an entirety of the family tree data stored on the server;
causing the graphical user interface of the application, in a viewing session, to display an initial view of the family tree associated with the target individual, the initial view displaying an initial set of family members of the target individual, the initial set corresponding to the first portion of the family tree data that is smaller than the entirety of the family tree data stored on the server;
receiving, at the application, an expand request from a user to expand the initial view, the expand request associated with a particular family member in the family tree and being a request to expand the initial view to an expanded view that displays one or more family members related to the particular family member relative to the initial view, the one or more family members related to the particular family member being beyond the initial set of family members;
transmitting, to the server, a request for required data associated with the expanded view, wherein the required data corresponds to the second portion of the family tree data;
receiving, from the server, the second portion of the family tree data at the application residing on the user device remote from the server; and
causing the viewing session to add the one or more family members related to the particular family member to generate the expanded view of the family tree, the expanded view partially adjusting the initial view without refreshing the viewing session;
wherein the family tree in the viewing session comprises an ego-dependent label, the ego-dependent label describing a relationship category between a family member and the target individual, wherein the ego-dependent label is arranged proximate an edge between a node representing the target individual and a node representing the family member.

2. The computer-implemented method of claim 1, wherein the expanded view is further expandable through the one or more family members related to the particular family member added in the expanded view.

3. The computer-implemented method of claim 1, wherein a number of family members in the initial set of family members is limited to a predetermined maximum limit.

4. The computer-implemented method of claim 1, wherein the initial view comprises the target individual, a spouse of the target individual, a biological parent of the target individual, and a child of the target individual.

5. The computer-implemented method of claim 4, wherein the spouse is a first-married spouse of the target individual.

6. The computer-implemented method of claim 1, wherein the ego-dependent label is determined based on ahnentafel numbers.

7. The computer-implemented method of claim 1, wherein the initial tree of the family view includes a default number of generations of family members related to the target individual.

8. The computer-implemented method of claim 1, wherein the expanded view expands the initial view one or more generations upward, one or more generations downward, or laterally within a same generation as the target individual.

9. The computer-implemented method of claim 1, wherein the family tree in the viewing session is collapsible locally.

10. The computer-implemented method of claim 1, wherein the one or more family members related to the particular family member are stored in a cache associated with the graphical user interface prior to the expand request.

11. The computer-implemented method of claim 1, wherein the expand request is initiated by a selection of a control element, the control element being arranged at a side of a node representing the particular family member, and the control element points to a direction of expansion.

12. The computer-implemented method of claim 1, wherein the ego-dependent label is arranged as overlaying the edge between the node representing the target individual and the node representing the family member.

13. A system comprising:
one or more processors; and
a non-transitory computer-readable medium comprising instructions that, when executed by the one or more processors, cause the one or more processors to perform operations comprising:
receive, at an application residing on a user device remote from a server, the application comprising a graphical user interface, a selection of a target individual who is associated with a family tree, wherein the target individual is associated with family tree data of the target individual stored on the server remote from the user device, the server in communication with the application comprising the graphical user interface, the family tree data stored on the server comprising a first portion and a second portion;
receive, from the server, a first portion of the family tree data at the application residing on the user device remote from the server, the first portion being smaller than an entirety of the family tree data stored on the server;
cause the graphical user interface, in a viewing session, to display an initial view of the family tree associated with the target individual, the initial view displaying an initial set of family members of the target individual, the initial set corresponding to the first portion of the family tree data that is smaller than the entirety of the family tree data stored on the server;
receive, at the application, an expand request from a user to expand the initial view, the expand request associated with a particular family member in the family tree and being a request to expand the initial view to an expanded view that displays one or more family members related to the particular family member relative to the initial view, the one or more family members related to the particular family member being beyond the initial set of family members;
transmit, to the server, a request for required data associated with the expanded view, wherein the required data corresponds to the second portion of the family tree data;
receive, from the server, the second portion of the family tree data at the application residing on the user device remote from the server; and
cause the viewing session to add the one or more family members related to the particular family member to generate the expanded view of the family tree, the expanded view partially adjusting the initial view without refreshing the viewing session;
wherein the family tree in the viewing session comprises an ego-dependent label, the ego-dependent label describing a relationship category between a family member and the target individual, wherein the ego-dependent label is arranged proximate an edge between a node representing the target individual and a node representing the family member.

14. The system of claim 13, wherein the expanded view is further expandable through the one or more family members related to the particular family member added in the expanded view.

15. The system of claim 13, wherein a number of family members in the initial set of family members is limited to a predetermined maximum limit.

16. The system of claim 13, wherein the expanded view expands the initial view one or more generations upward, one or more generations downward, or laterally within a same generation as the target individual.

17. The system of claim 13, wherein the family tree in the viewing session is collapsible locally.

18. The system of claim 13, wherein the one or more family members related to the particular family member are stored in a cache associated with the graphical user interface prior to the expand request.

19. A non-transitory computer-readable medium configured to store code comprising instructions, wherein the instructions, when executed by one or more processors, cause the one or more processors to perform steps comprising:
receiving, at an application residing on a user device remote from a server, the application comprising a graphical user interface, a selection of a target individual who is associated with a family tree, wherein the target individual is associated with family tree data of the target individual stored on the server, the family tree data stored on the server comprising a first portion and a second portion;
receiving, from the server, the first portion of the family tree data at the application residing on the user device remote from the server, the first portion being smaller than an entirety of the family tree data stored on the server;
causing the graphical user interface of the application, in a viewing session, to display an initial view of the family tree associated with the target individual, the initial view displaying an initial set of family members of the target individual, the initial set corresponding to the first portion of the family tree data, wherein the first portion is smaller than an entirety of the family tree data;
receiving, at the application, an expand request from a user to expand the initial view, the expand request associated with a particular family member in the family tree and being a request to expand the initial view to an expanded view that displays one or more family members related to the particular family member relative to the initial view, the one or more family members related to the particular individual being beyond the initial set of family members;
transmitting, to the server, a request for required data associated with the expanded view, wherein the required data corresponds to a second portion of the family tree data;

receiving, from the server, the second portion of the family tree data at the application residing on the user device remote from the server; and causing the viewing session to add the one or more family members related to the particular family member to generate the expanded view of the family tree, the expanded view partially adjusting the initial view without refreshing the viewing session;

wherein the family tree in the viewing session comprises an ego-dependent label, the ego-dependent label describing a relationship category between a family member and the target individual, wherein the ego-dependent label is arranged proximate an edge between a node representing the target individual and a node representing the family member.

20. The non-transitory computer-readable medium of claim 19, wherein the one or more family members related to the particular family member are stored in a cache associated with the graphical user interface prior to the expand request.

* * * * *